United States Patent
Horii

(10) Patent No.: US 8,842,244 B2
(45) Date of Patent: Sep. 23, 2014

(54) CHARACTER TYPE VERTICAL ALIGNMENT MODE LIQUID CRYSTAL DISPLAY DEVICE COMPRISING WALL LAYERS WITH A SHAPE ALONG A PERIPHERY OF ONE OF DISPLAY PATTERNS FORMED BY SUPERPOSING SEGMENT AND COMMON ELECTRODES

(71) Applicant: Stanley Electric Co., Ltd., Tokyo (JE)

(72) Inventor: Masatoshi Horii, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 14/075,584

(22) Filed: Nov. 8, 2013

(65) Prior Publication Data
US 2014/0085581 A1    Mar. 27, 2014

Related U.S. Application Data

(63) Continuation of application No. 12/617,918, filed on Nov. 13, 2009, now abandoned.

(30) Foreign Application Priority Data

Dec. 3, 2008 (JP) ................. 2008-308354
Dec. 4, 2008 (JP) ................. 2008-309532

(51) Int. Cl.
*G02F 1/1337* (2006.01)
*G02F 1/1339* (2006.01)
*G02F 1/1343* (2006.01)

(52) U.S. Cl.
CPC ........ *G02F 1/1337* (2013.01); *G02F 1/134327* (2013.01); *G02F 1/133707* (2013.01)
USPC ......................................... 349/130; 349/156

(58) Field of Classification Search
CPC ................. G02F 2001/133742; G02F 1/13392
USPC ............................... 349/123–132, 156
See application file for complete search history.

(56) References Cited

U.S. PATENT DOCUMENTS 5,946,070 A    8/1999  Kohama et al.
6,061,117 A    5/2000  Horie et al.
(Continued)

FOREIGN PATENT DOCUMENTS

JP    58-216223 A    12/1983
JP    11-242225 A    9/1999
(Continued)

OTHER PUBLICATIONS

Japanese Office Action dated Apr. 24, 2013 (and English translation thereof) in counterpart Japanese Application No. 2008-308354.

(Continued)

*Primary Examiner* — Paul Lee
(74) *Attorney, Agent, or Firm* — Holtz Holtz Goodman & Chick PC

(57) ABSTRACT

In a character type vertical alignment type liquid crystal display device including first and second substrates opposing each other, a first electrode layer including a plurality of first electrodes provided at an inner side of the first substrate, a second electrode layer including a plurality of second electrodes provided at an inner side of the second substrate, and a vertical alignment mode liquid crystal layer provided between the first and second substrates, a wall structure is provided between the first and second substrates.

9 Claims, 20 Drawing Sheets

(56) References Cited

U.S. PATENT DOCUMENTS

| | | |
|---|---|---|
| 6,281,960 B1 | 8/2001 | Kishimoto et al. |
| 6,335,780 B1 | 1/2002 | Kurihara et al. |
| 6,437,847 B1 | 8/2002 | Kishimoto |
| 6,501,524 B1 | 12/2002 | Yoshida et al. |
| 6,661,488 B1 | 12/2003 | Takeda et al. |
| 6,724,452 B1 | 4/2004 | Takeda et al. |
| 6,816,223 B2 | 11/2004 | Sugiyama et al. |
| 7,167,224 B1 | 1/2007 | Takeda et al. |
| 7,224,421 B1 | 5/2007 | Takeda et al. |
| 7,227,606 B2 | 6/2007 | Takeda et al. |
| 7,304,703 B1 | 12/2007 | Takeda et al. |
| 7,760,305 B2 | 7/2010 | Takeda et al. |
| 7,821,603 B2 | 10/2010 | Takeda et al. |
| 7,965,363 B2 | 6/2011 | Takeda et al. |
| RE43,123 E | 1/2012 | Sasabayashi et al. |
| 8,134,671 B2 | 3/2012 | Takeda et al. |
| 2001/0055088 A1* | 12/2001 | Kume et al. ................ 349/156 |
| 2003/0156242 A1 | 8/2003 | Kim et al. |
| 2005/0001959 A1 | 1/2005 | Chang |
| 2007/0064187 A1 | 3/2007 | Takeda et al. |
| 2008/0180620 A1 | 7/2008 | Iwamoto et al. |
| 2010/0097559 A1 | 4/2010 | Horii |
| 2012/0120338 A1 | 5/2012 | Takeda et al. |

FOREIGN PATENT DOCUMENTS

| | | |
|---|---|---|
| JP | 11-311786 A | 11/1999 |
| JP | 2000-019531 A | 1/2000 |
| JP | 2000-056296 A | 2/2000 |
| JP | 2000-056305 A | 2/2000 |
| JP | 2000-321578 A | 11/2000 |
| JP | 2001-100219 A | 4/2001 |
| JP | 2001-166317 A | 6/2001 |
| JP | 2001-174851 A | 6/2001 |
| JP | 2001-235748 A | 8/2001 |
| JP | 2002-162632 A | 6/2002 |
| JP | 2002-229035 A | 8/2002 |
| JP | 2004-252298 A | 9/2004 |
| JP | 2005-234254 A | 9/2005 |
| JP | 2007-187720 A | 7/2007 |
| JP | 2007-233220 A | 9/2007 |
| JP | 2008-070470 A | 3/2008 |

OTHER PUBLICATIONS

Japanese Office Action dated Nov. 20, 2012 (and English translation thereof) in counterpart Japanese Application No. 2008-308354.

Japanese Office Action dated Nov. 20, 2012 (and English translation thereof) in counterpart Japanese Application No. 2008-309532.

U.S. Appl. No. 12/571,569; First Named Inventor: Masatoshi Horii; Title: "Simple Matrix Vertical Alignment Mode Liquid Crystal Display Device With Linear Wall Layers"; filed Oct. 1, 2009.

* cited by examiner

Fig. 4
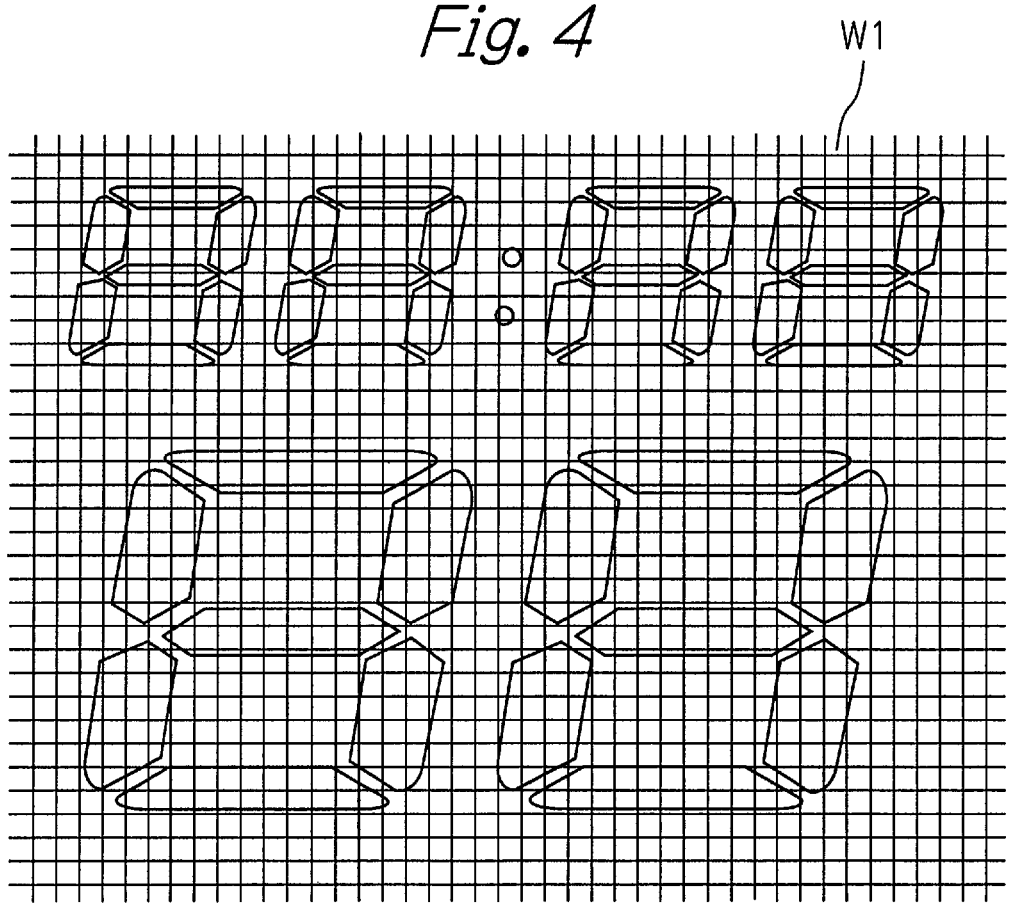
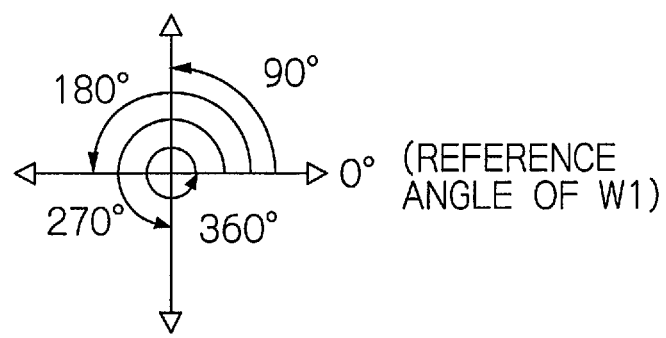

Fig. 5
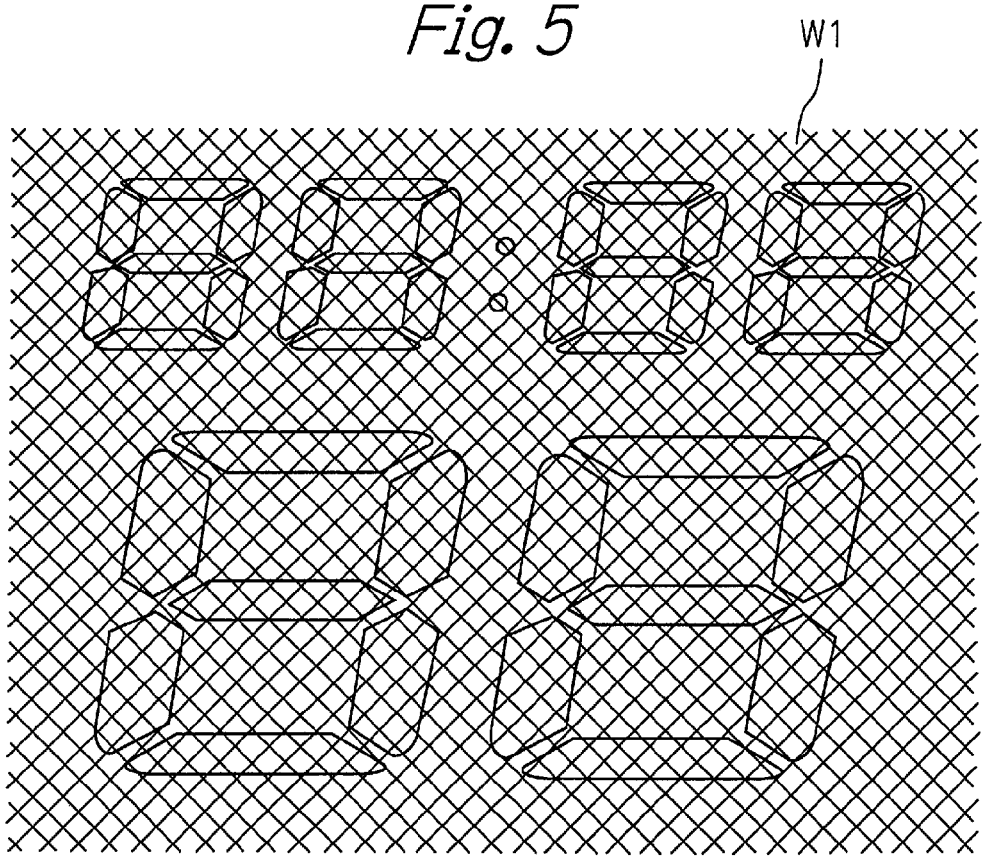
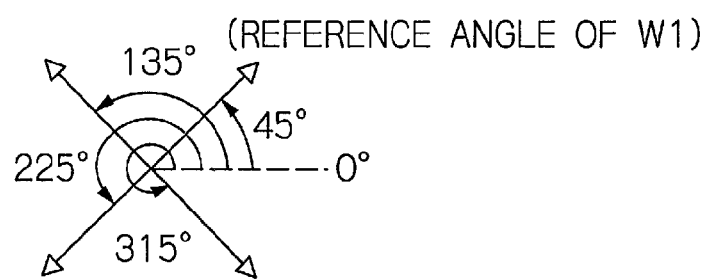
(REFERENCE ANGLE OF W1)

FIG. 16
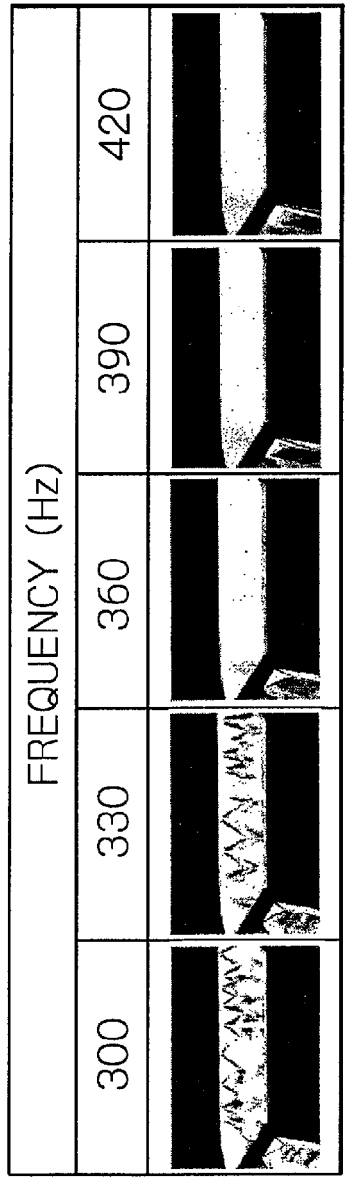
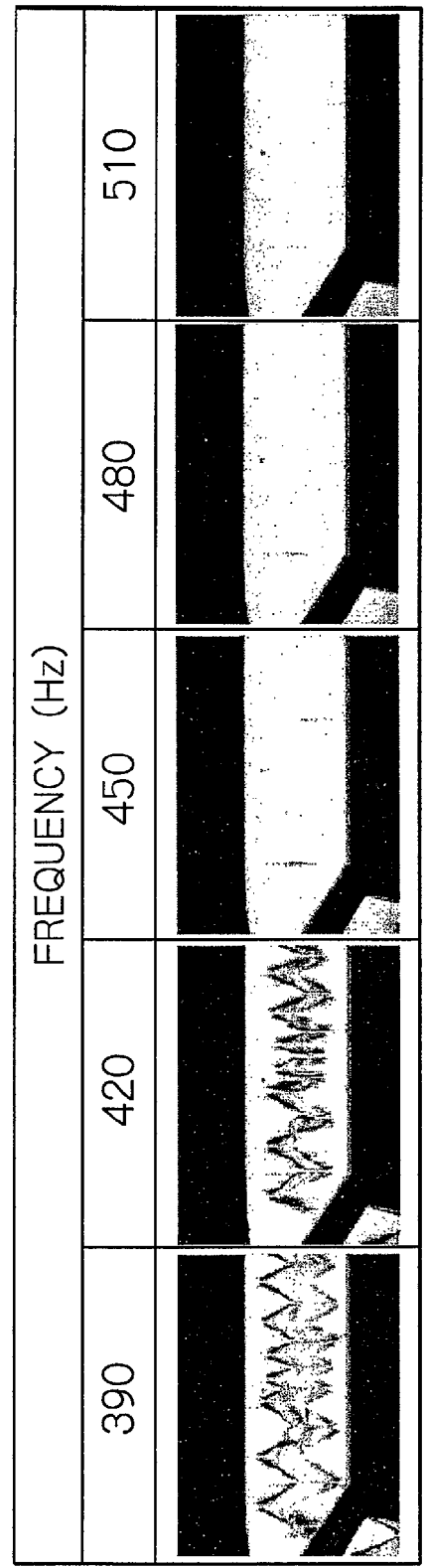

CHARACTER TYPE VERTICAL ALIGNMENT MODE LIQUID CRYSTAL DISPLAY DEVICE COMPRISING WALL LAYERS WITH A SHAPE ALONG A PERIPHERY OF ONE OF DISPLAY PATTERNS FORMED BY SUPERPOSING SEGMENT AND COMMON ELECTRODES

This is a Continuation of U.S. application Ser. No. 12/617,918, filed Nov. 13, 2009, which claims the benefit of priority under 35 U. S. C. §119 from prior Japanese Patent Application Nos. JP2008-308354 and JP2008-309532, filed Dec. 3, 2008 and Dec. 4, 2008, respectively, the entire contents of all of which are incorporated herein by reference.

BACKGROUND

1. Field

The presently disclosed subject matter relates to a character type vertical alignment mode liquid crystal display (LCD) device.

2. Description of the Related Art

In a prior art character type vertical alignment mode LCD device, since liquid crystal molecules are vertically aligned with respect to substrates while applying no voltage thereto, the black representation is excellent. Also, when an optical compensation plate or a retardation film having a negative optical isomer property is introduced onto one or both polarizers, the viewing angle properties are very excellent (see: JP2005-234254A).

Also, a rubbing aligning process or an ultraviolet ray aligning process is performed upon alignment layers, to thereby realize a mono-domain alignment in a vertical alignment mode liquid crystal layer. On the other hand, slits are provided on electrode layers or ridges are provided on substrates, to thereby realize a multi-domain alignment in a vertical alignment mode liquid crystal layer. Particularly, the above-mentioned mono-domain aligning process can make the alignment state of the vertical alignment mode liquid crystal layer uniform regardless of whether or not a voltage is applied thereto.

Further, in order to avoid alignment defects in the vertical alignment mode liquid crystal layer while applying a voltage thereto, a pretilt angle is allocated so that liquid crystal molecules in the vertical alignment mode liquid crystal layer are tilted a little from a vertical angle (90°) with respect to the substrates while applying no voltage thereto.

In the above-described prior art character type vertical alignment mode LCD device without requiring thin film transistors (TFTs), a multiplexing driving is used. A typical multiplexing driving is based on an optimal bias method whose driving waveforms are an in-frame-reversal driving waveform or a line-reversal driving waveform (hereinafter, referred to as an A-waveform), a frame-reversal driving waveform (hereinafter, referred to as a B-waveform), and a multi-line-reversal driving waveform (hereinafter, referred to as a C-waveform). Note that the B-waveform is now often used in view of the small power consumption.

In the above-described prior art character type vertical alignment mode LCD device, however, since the anchoring force of the direction of the azimuth of liquid crystal on the plane of the substrates is weaker than that of a horizontal alignment mode LCD device such as a twisted nematic-mode (TN-mode) LCD device, when the direction of the azimuth of liquid crystal on the plane of the substrates is deviated by some external factors from a direction set by an alignment process, the retardation would be partly changed, so that a low transmittivity region would be visible as a "black shadow region" within a white pixel (dot) of the vertical alignment mode liquid crystal layer while applying a voltage thereto. Also, if the viewing angle is changed, the black shadow region would be visible as a "rough region". Further, if one black shadow region within one white dot reaches another black shadow region of its adjacent white dot, a plurality of black shadow regions are visible as an "irregularly-continuous region" within continuous white dots. The phenomenon of such a black shadow region, a rough region and an irregularly-continuous region is called a dynamic misalignment (DMA) phenomenon which would not only decrease the uniformity of representation of dots, but would erase patterns represented by dots.

The generation state of the above-mentioned DMA phenomenon may be changed due to various internal factors such as a pretilt angle affecting the anchoring force of the azimuth of the direction of liquid crystal on the plane of the substrates and the frame response phenomenon of liquid crystal.

Also, the generation state of the above-mentioned DMA phenomenon may be changed due to some external factors. One of the external factors is an oblique electric field generated between electrode layers, i.e., a segment electrode layer and a common electrode layer. In more detail, an oblique electric field is generated between an edge of one segment electrode of the segment electrode layer and an even portion of one common electrode of the common electrode layer. Similarly, an oblique electric field is generated between an edge of one common electrode of the common electrode layer and an even portion of one segment electrode of the segment electrode layer. Particularly, the generation state of the DMA phenomenon in the vertical alignment mode LCD device is strongly affected by the above-mentioned oblique electric field. That is, since the liquid crystal in the vertical alignment mode LCD device is of a negative type, the director of liquid crystal can easily fall along a direction perpendicular to an electric line of force of an electric field applied thereto, so that the director of liquid crystal easily falls along a direction perpendicular to an electric line of force of the above-mentioned fringe field. Therefore, if the director of liquid crystal is different from a director of liquid crystal set by an alignment process, a black shadow region would be visible between the boundaries of the segment and common electrodes.

In the above-described prior art character type vertical alignment mode LCD device, since the pretilt angle is around 90° so that the anchoring force of liquid crystal along the direction of the azimuth thereof on the plane of the substrates is very small, and also, the liquid crystal is in a high response speed state, the liquid crystal is easily moved along the direction of the azimuth thereof on the plane of the substrates. That is, the above-mentioned high pretilt angle is required to improve the sharpness for high viewing angle properties at a high duty ratio driving operation. Also, the above-mentioned high response speed state can be realized by the low viscosity of liquid crystal, a thin thickness of a liquid crystal layer, a high operational temperature and so on. As a result, a director of liquid crystal would be generated from a start position where an oblique electric field whose direction is different from the direction of the azimuth of liquid crystal set by the alignment process is generated along a direction different from the direction of azimuth of liquid crystal set by an alignment process. In this case, since liquid crystal molecules have forces to make them parallel with each other, and the anchoring force of liquid crystal along the direction of the azimuth thereof on the plane of the substrates is very small, as stated above, a black shadow region with deviated directors of liquid crystal is spread gradually from the above-mentioned start position to its peripheral positions. Thus, a large number of directors of liquid crystal are deviated from the alignment direction set by the alignment process.

In order to avoid the generation of the above-mentioned black shadow region, one approach is to suppress the frame response phenomenon. That is, a high frequency driving method increasing the frame frequency and using the A-waveform, the C-waveform or a multi-line addressing (MLA) waveform is carried out to decrease a pulse interval by a multiplexing driving. However, this high frequency driving method would increase the power consumption and also, would increase the crosstalk phenomenon by resistance components of the electrode layers.

SUMMARY

The presently disclosed subject matter seeks to solve one or more of the above-described problems.

According to the presently disclosed subject matter, in a character type vertical alignment mode LCD device including first and second substrates opposing each other, a first electrode layer including a plurality of first electrodes provided at an inner side of the first substrate, a second electrode layer including a plurality of second electrodes provided at an inner side of the second substrate, and a vertical alignment mode liquid crystal layer provided between the first and second substrates, a wall structure is provided between the first and second substrates.

The wall structure comprises a grid-shaped wall layer.

Generally, in a character type vertical alignment mode LCD device, since display patterns formed by straight lines and curves have complex shapes, the relationship between an oblique electric field caused by an edge of an electrode and an even portion of another electrode and the director of liquid crystal caused by a pretilt angle is more complex than that of a dot-matrix vertical alignment LCD device, so that the DMA phenomenon is easily generated. On the other hand, the DMA phenomenon has liquid properties. Therefore, the inventor has found the grid-shaped wall layer to suppress the propagation of liquid crystal along all directions, thus suppressing the propagation of the DMA phenomenon.

Also, the wall structure has wall layers each with a shape along a periphery of one of display patterns formed by superposing the segment electrodes onto the common electrodes.

Further, the wall structure has additional wall layers having reduced shapes of the wall layers.

The above-mentioned wall layers and additional wall layers suppress the generation of the detector of liquid crystal by the mutual alignment ability of liquid crystal modules, thus suppressing the propagation of the DMA phenomenon.

According to the presently disclosed subject matter, the propagation of the DMA phenomenon can be suppressed. Also, since a high frequency driving is unnecessary, the power consumption can be decreased and also, the crosstalk can be decreased. Further, since the DMA phenomenon in a high temperature region can be decreased, the operational margin can be broadened. Furthermore, since the pretilt angle can be increased, the sharpness, i.e., the contrast can be improved and, also, the viewing angle properties can be improved.

BRIEF DESCRIPTION OF THE DRAWINGS

The above and other advantages and features of the presently disclosed subject matter will be more apparent from the following description of certain embodiments, as compared with the prior art, taken in conjunction with the accompanying drawings, wherein:

FIG. 4 is a layout diagram illustrating a first embodiment of the character type vertical alignment mode LCD device according to the presently disclosed subject matter;

FIG. 5 is a layout diagram illustrating a modification of the character type vertical alignment mode LCD device of FIG. 4;

FIGS. 15 and 16 are microscopic picture diagrams for explaining the experimental results obtained by driving the character type vertical alignment mode LCD device of FIG. 11;

DETAILED DESCRIPTION OF EXEMPLARY EMBODIMENTS

Before the description of exemplary embodiments, a prior art character type vertical alignment mode LCD device will now be explained with reference to FIGS. 1, 2 and 3.

Figure 1:
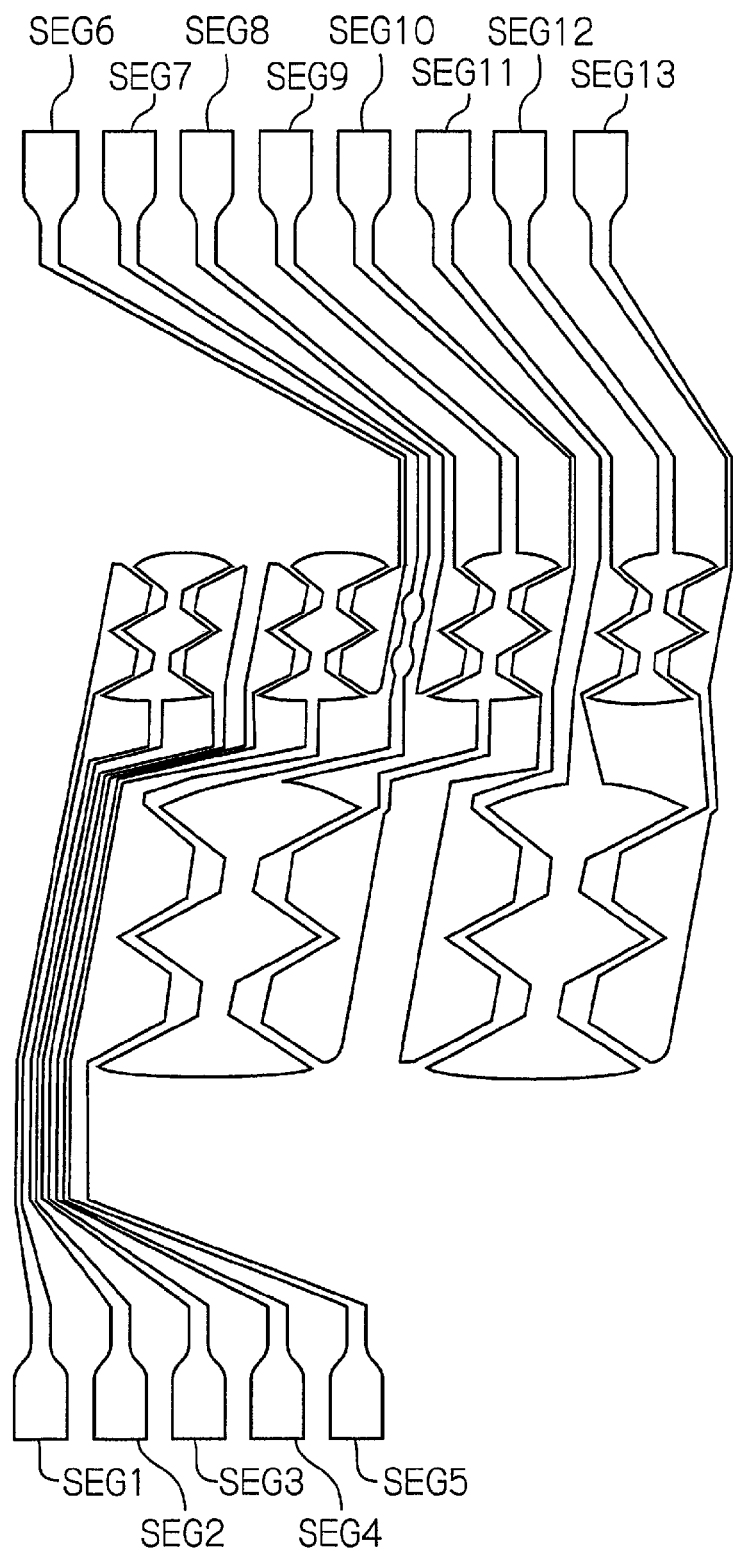
FIG. 1 is a layout diagram illustrating segment electrodes of a prior art character type vertical alignment mode LCD device.

In FIG. 1, segment electrodes SEG1, SEG2, . . . , SEG13 are provided. Also, in FIG. 2, common electrodes COM1, COM2, . . . , COM6 are provided. Further, in FIG. 3, display patterns are provided. In this case, the display patterns of FIG. 3 are realized by superposing the segment electrodes SEG1, SEG2, . . . , SEG13 of FIG. 1 onto the common electrodes COM1, COM2, . . . , COM6 of FIG. 2.

Figure 3:
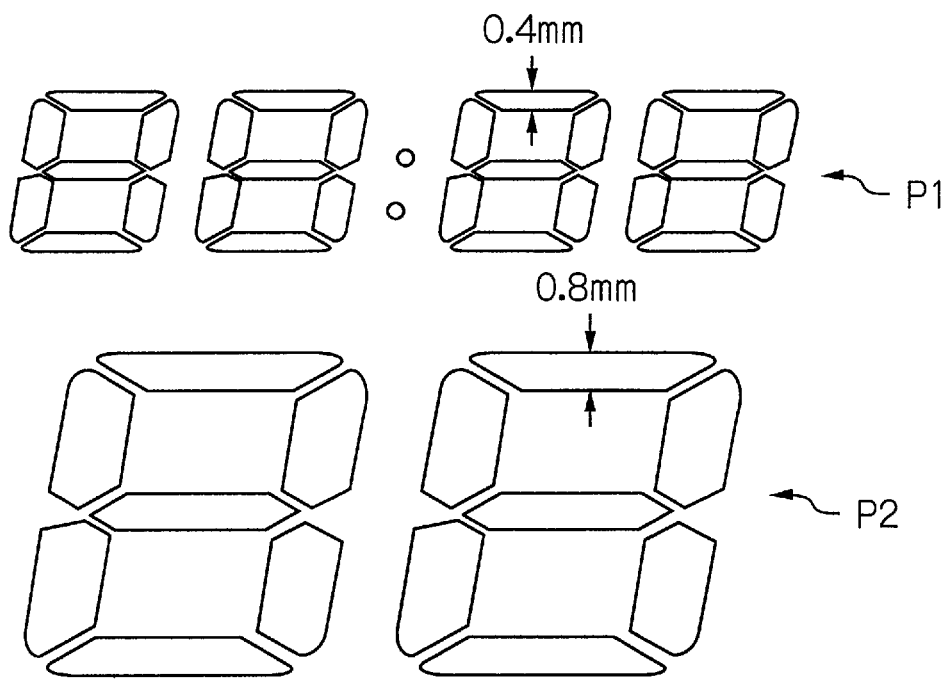
FIG. 3 is a layout diagram of display patterns of the prior art character type vertical alignment mode LCD device by superposing the segment electrodes of FIG. 1 onto the common electrodes of FIG. 2.

The display patterns of FIG. 3 are divided into a small-sized pattern P1 and a large-sized pattern P2. The small-sized pattern P1 has a line-width of about 0.4 mm (400 μm), and the large-sized pattern P2 has a line-width of about 0.8 mm (800 μm).

Figure 2:
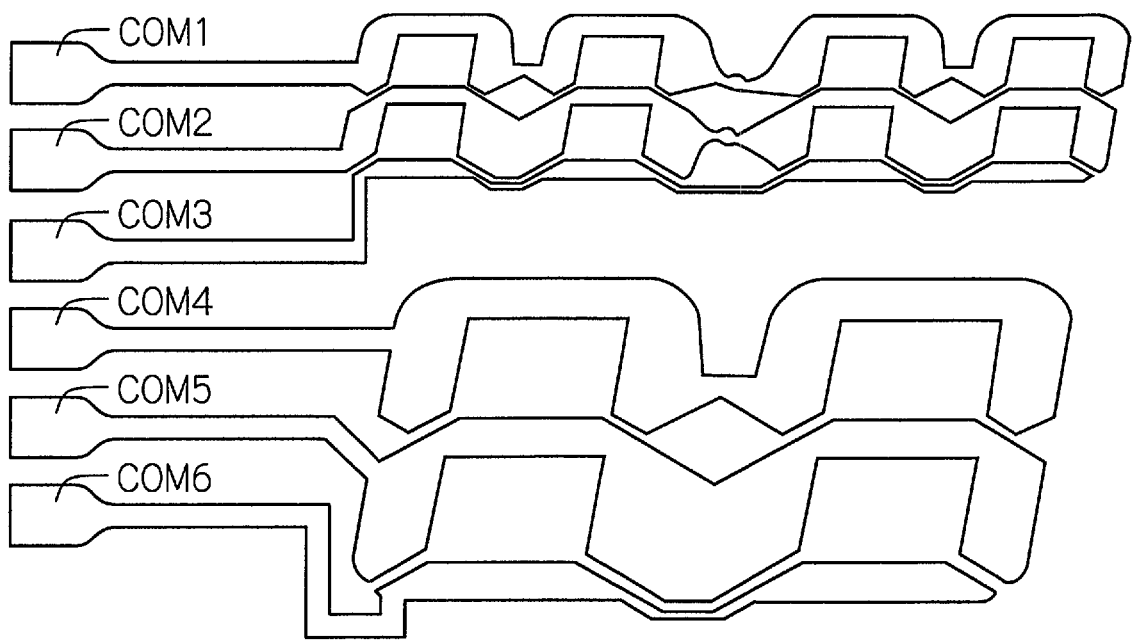
FIG. 2 is a layout diagram illustrating common electrodes of the prior art character type vertical alignment mode LCD device.

In FIG. 4, which illustrates a first embodiment of the character type vertical alignment mode LCD device according to the present invention, a grid-shaped wall layer W1 is added to the elements of the prior art character type vertical alignment mode LCD device of FIGS. 1, 2 and 3. In FIG. 4, note that the display patterns of FIG. 3 are illustrated, but the segment electrodes SEG1, SEG2, . . . , SEG13 of FIG. 1 and the common electrodes COM1, COM2, . . . , COM6 of FIG. 2 are omitted.

As illustrated in FIG. 4, assume that the right direction viewed from the top is 0°, the upper direction is 90°, the left direction is 180°, and the lower direction is 270°, the reference angle of the grid-shaped wall layer W1 is 0°. In this case, the grid-shaped wall layer W1 has no relation to the display patterns. Even when the reference angle of the grid-shaped wall layer W1 is an arbitrary angle deviated from 0°, the suppressing effect of the propagation of the DMA phenomenon is unchanged. Particularly, when the grid-shaped wall layer W1 interferes with a light output distribution due to the structure of a backlight guide plate such as the prism thereof to generate moiré fringes, the reference angle of the grid-shaped wall layer W1 can be deviated a little from 0° to suppress the moiré fringes.

In FIG. 5, which illustrates a modification of the character type vertical alignment mode LCD device of FIG. 4, the reference angle of the grid-shaped wall layer W1 is 45°. In this case, polarizers (see 11 and 21 of FIG. 6) cross at 90°, and the polarizing angles of the polarizers are +45° and −45° (315°), respectively. That is, the refractive index of the grid-shaped wall layer W1 is generally different from that of liquid crystal, so that a light penetration state may be established due to the different compensation conditions viewed from the oblique side. Thus, the black representation may deteriorate. In order to improve the black representation in such a state, the reference angle of the grid-shaped wall layer W1 coincides with one of the polarizing angles of the polarizers, i. e., 45°, thus improving the visibility of all the display patterns.

Figure 6:
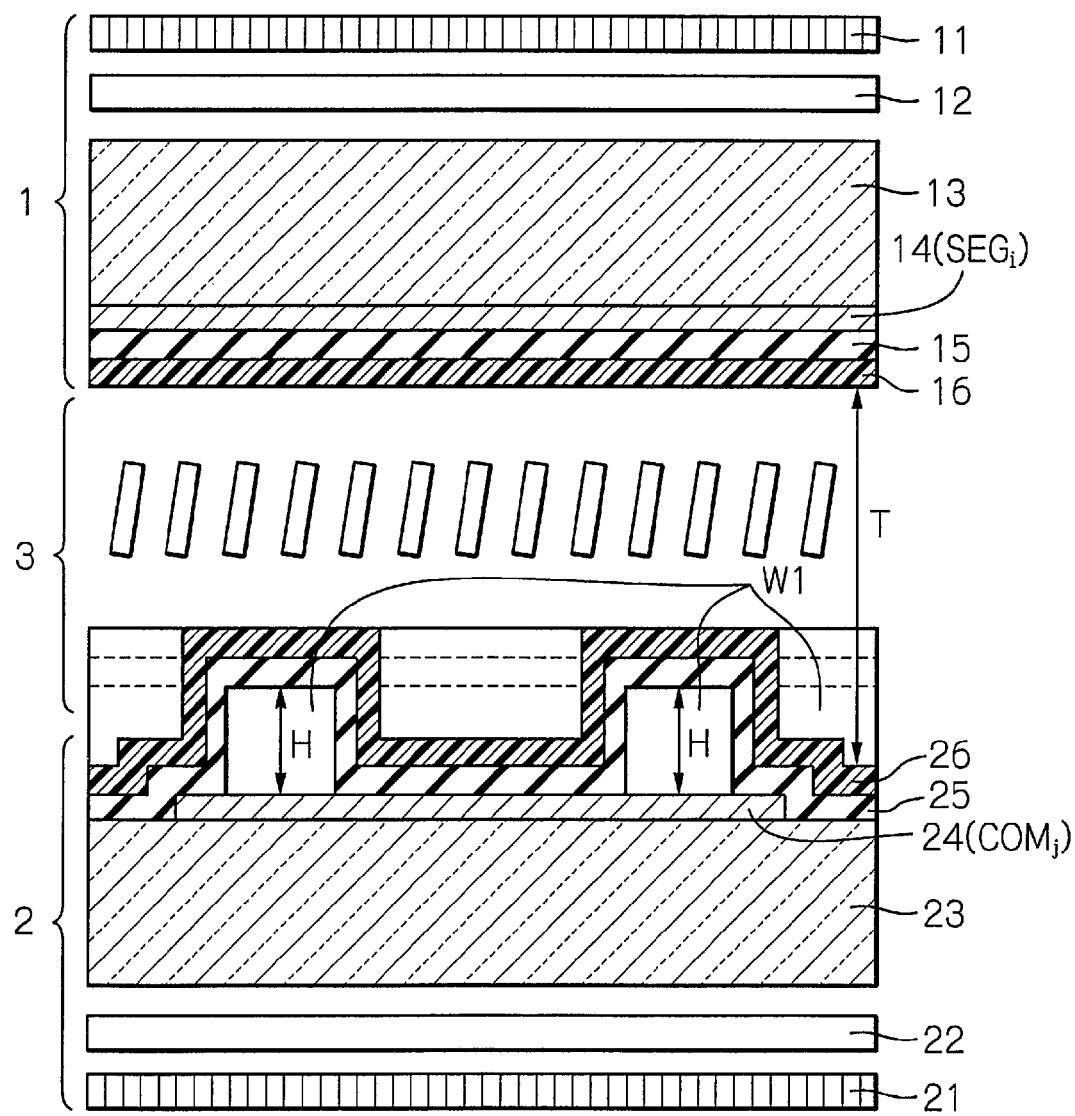
FIG. 6 is a cross-sectional view of the character type vertical alignment mode LCD device of FIG. 4 or 5.

Referring to FIG. 6, which is a cross-sectional view of the character type vertical alignment mode LCD device of FIG. 4 or 5, an upper structure 1 includes the above-mentioned polarizer 11, and a lower structure 2 includes the above-mentioned polarizer 21. Also, a vertical alignment mode liquid crystal layer 3 is interposed between the upper structure 1 and the lower structure 2.

The upper structure 1 is formed by the polarizer 11, an optical compensation plate 12, a glass substrate 13, a transparent segment electrode layer 14, an insulating layer 15 and a vertical alignment layer 16. Similarly, a lower structure 2 is formed by the polarizer 21, an optical compensation plate 22, a glass substrate 23, a transparent common electrode layer 24, the above-mentioned grid-shaped wall layer W1, an insulating layer 25 and a vertical alignment layer 26.

The segment electrode layer 14 forms the segment electrodes SEG1, SEG2, . . . , SEG13 of FIG. 1, and the common electrode layer 24 forms the common electrodes COM1, COM2, . . . , COM6 of FIG. 2.

The polarizers 11 and 21 are made of iodine-including material or dye-including material such as SHC-13U (trademark) by Polatechno, Japan. The polarizers 11 and 21 cross at 90°. In this case, the angles of the polarizers 11 and 21 are +45° and −45°, respectively, with respect to the set director of liquid crystal of the vertical alignment mode liquid crystal layer 3 to form a crossed Nicols combination, so that a change of the difference in phase while applying a voltage thereto is maximum. Note that the crossing angle of the polarizers 11 and 21 may be deviated by a few degrees from 90°. The director of liquid crystal is in an upper direction (12 o'clock direction) or in a lower direction (6 o'clock direction) viewed from the top, thus obtaining a broad viewing angle representation having symmetrical viewing angle properties.

Each of the optical compensation plates 12 and 22 is a uniaxial retardation plate which is constructed by a so-called negative C-plate where the in-plane retardation value $\Delta R_e$ is 0 nm and the thickness direction retardation value $\Delta R_{th}$ is 220 nm. An A-plate or a biaxial retardation plate called a B-plate may be used instead of the C-plate.

The transparent segment electrode layer 14 and the transparent common electrode layer 24 are made of indium tin oxide (ITO) or the like.

The insulating layers 15 and 25 are used for electrically-isolating the transparent segment electrode layer 14 and the transparent common electrode layer 24, respectively, so as to prevent a short-circuited state between the electrode layers 14 and 24 due to a foreign substance within the vertical alignment mode liquid crystal layer 3.

The vertical alignment layers 16 and 26 are made of polyimide or inorganic material. The alignment treatment of the vertical alignment layers 16 and 26 is carried out by a protrusion alignment process, a rubbing alignment process or an ultraviolet ray alignment process. For example, a polyimide layer is coated thereon by a flexographic printing process and then is cured. Then, a rubbing alignment process is carried out to give a pretilt angle $\theta_p$ of 89.5° or 89.9°. In this case, the direction of the pretilt angle of the vertical alignment layer 26 is 90° in the counterclockwise rotation with respect to the right direction (=0°), while the direction of the pretilt angle of the vertical alignment layer 16 is 90° in the clockwise rotation with respect to the right Direction (=0°), thus realizing an anti-parallel alignment.

The vertical alignment mode liquid crystal layer 3 is of a negative mono-domain type where the dielectric anisotropy $\Delta \in$ is −2.6 and the optical anisotropy $\Delta n$ is 0.20. The thickness of the vertical alignment mode liquid crystal layer 3 is about 2.0 μm. A chiral agent can be added to the vertical alignment mode liquid crystal layer 3 to avoid the reverse twist phenomenon, thereby realizing a twist structure.

The grid-shaped wall layer W1 has about 50 μm wide wall layers at an interval (pitch) of about 435 μm on the transparent common electrode layer 24 and the glass substrate 23. Also, a height H of the grid-shaped wall layer W1 is $$H \geq T/2$$

where T is a thickness of the vertical alignment mode liquid crystal layer 3, for example, about 2 μm. Note that thicknesses of the electrode layers 14 and 24, the insulating layers 15 and 25 and the vertical alignment layers 16 and 26 are much smaller than the thickness T of the vertical alignment mode liquid crystal layer 3; however, these thicknesses are exaggeratedly illustrated for better understanding.

The grid-shaped wall layer W1 is transparent. However, the grid-shaped wall layer W1 can be opaque (black matrix) in order to maintain the sharpness even if the viewing angle is changed.

The grid-shaped wall layer W1 is formed as follows. For example, an about 1 μm thick ultraviolet ray hardening resin is coated by a spin coater, and then, the ultraviolet ray hardening resin is temporarily dried. Then, the ultraviolet ray hardening resin is patterned by an ultraviolet ray photolithography process using a grid-shaped patterned photomask. If the grid-shaped wall layer W1 is opaque, carbon or several kinds of pigments may be included as black material in the ultraviolet ray hardening resin. Also, since the grid-shaped wall layer W1 is formed directly on the common electrode layer 24 forming the common electrodes COM1, COM2, ..., COM6, the grid-shaped wall layer W1 generally needs to be made of electrically-insulating material whose resistance value is larger than $10^9$ Ωm. Therefore, the above-mentioned carbon is insulating carbon. However, the above-mentioned carbon does not need to be insulating carbon due to the presence of the insulating layer 25. Note that, if the grid-shaped wall layer W1 is opaque, the line-width of the grid-shaped wall layer W1 should be as small as possible, i.e., about 50 μm to minimize the reduction of the aperture ratio.

Figure 7:
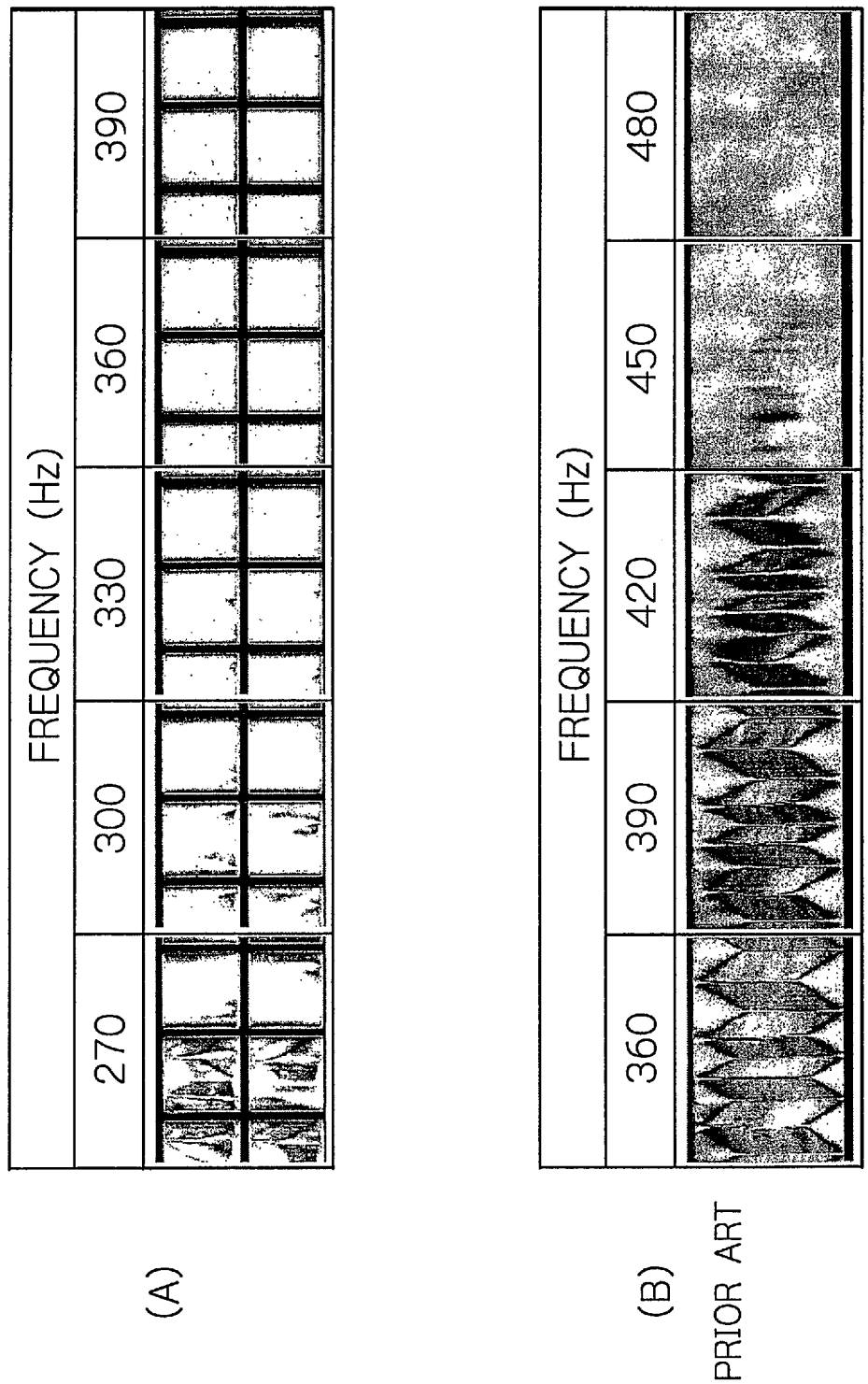
FIGS. 7 and 8 are microscopic picture diagrams for explaining the experimental results obtained by driving the character type vertical alignment mode LCD device of FIG. 6.

The experimental results of the character type vertical alignment mode LCD device of FIGS. 4 (5) and 6 driven by using the B-waveform at a 1/64 duty ratio and a bias of 1/9 are illustrated in FIG. 7.

As illustrated in FIG. 7(A), when $\theta_p$=89.5°, black shadow regions caused by the DMA phenomenon were visible at 330 Hz or less, while no black shadow regions were visible at 360 Hz or more, to realize an excellent transmission state of white dots.

Also, as illustrated in FIG. 7(B), when the prior art character type vertical alignment mode LCD device with no grid-shaped wall layer was driven under the same conditions as in FIG. 7(A), black shadow regions caused by the DMA phenomenon were visible at 450 Hz or less, while no black shadow regions were visible at 480 Hz or more, to realize an excellent transmission state of white dots.

Thus, the DMA phenomenon was also clearly suppressed as compared with the prior art character type vertical alignment mode LCD device with no grid-shaped wall layer.

Note that, when $\theta_p$=89.5°, if the thickness T of the vertical alignment mode liquid crystal layer 3 is 4 μm and the height H of the grid-shaped wall layer W1 is 2 μm (H=T/2), the DMA phenomenon was also suppressed. However, if the thickness T of the vertical alignment mode liquid crystal layer 3 was 4 μm and the height H of the grid-shaped wall layer W1 was 1 μm (H=T/4), the DMA phenomenon was not suppressed.

Figure 8:
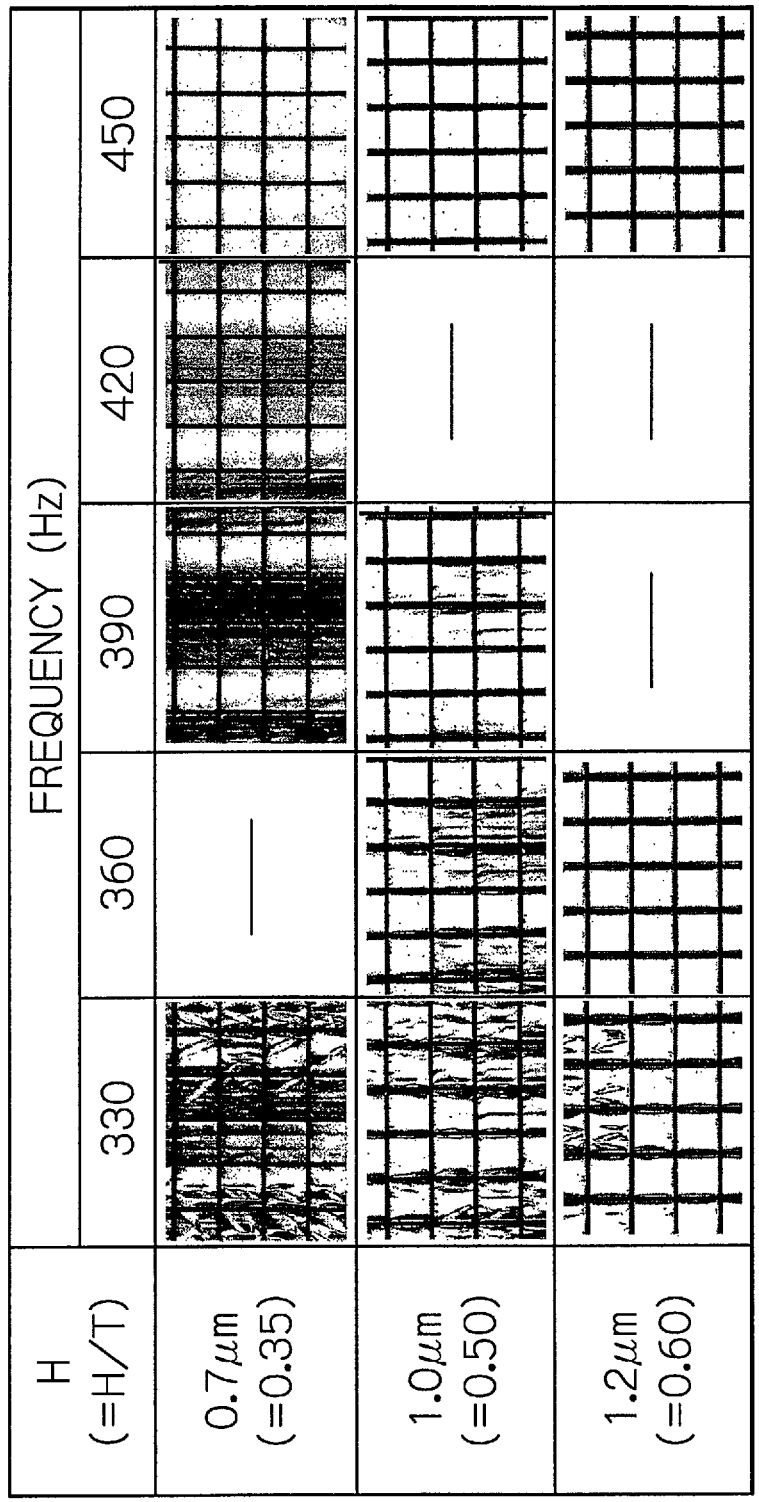

In more detail, as illustrated in FIG. 8 where $\theta_p$=89.9°, in order to suppress the DMA phenomenon, the following is satisfied:

$$H \geq T/2.$$

As illustrated in FIG. 8(A), when the thickness T of the vertical alignment mode liquid crystal layer 3 was 2 μm and the height H of the grid-shaped wall layer W1 was 0.7 μm (H/T=0.35), black shadow regions caused by the DMA phenomenon was visible even at 390 Hz. Therefore, the DMA phenomenon was not so suppressed as compared with the case where H=T/2 as illustrated in FIG. 8(B).

As illustrated in FIG. 8(C), when the thickness T of the vertical alignment mode liquid crystal layer 3 was 2 μm and the height H of the grid-shaped wall layer W1 was 1.2 μm (H/T=0.60), black shadow regions caused by the DMA phenomenon were visible at 330 Hz, while no black shadow regions were visible at 360 Hz or more. The DMA phenomenon was so suppressed as compared with the case where H=T/2 as illustrated in FIG. 8(B).

Thus, in order to suppress the DMA phenomenon, the following is satisfied:

$$H \geq T/2.$$

In this case, if H=T, it is impossible to move liquid crystal between the upper structure 1 and the lower structure 2 during a liquid crystal vacuum injecting process for forming the vertical alignment mode liquid crystal layer 3. Thus, in view of this, the following is satisfied:

$$H \leq 0.9T.$$

However, if a liquid crystal dropping process is used for forming the vertical alignment mode liquid crystal layer 3, where the liquid crystal dropping interval (pitch) is smaller than the interval (pitch) of the wall layers of the grid-shaped wall layer W1, H=T creates no problem. Of course, in the case of such a liquid crystal dropping process where the liquid crystal dropping interval (pitch) is not smaller than the interval (pitch) of the wall layers of the grid-shaped wall layer W1, the above-mentioned condition, i. e., H≤0.9 T should be satisfied in the same way as in a liquid crystal vacuum injecting process.

In the character type vertical alignment mode LCD device of FIGS. 4 (5) and 6, the interval of the wall layers of the grid-shaped wall layer W1 can be larger than 435 μm, i.e., 870 μm, 1305 μm and 1740 μm. Note that the intervals 870 μm, 1305 μm and 1740 μm of the wall layers correspond to wall layer's spacings 820 μm, 1255 μm and 1690 μm, respectively. In this case, the larger the interval of the wall layers, the less the suppressing effect of the DMA phenomenon. For example, when the interval of the wall layers was 870 μm or more, no black shadow regions were visible at 420 Hz or more. Therefore, the interval of the wall layers should be 400 μm or less.

On the other hand, since liquid crystal at the grid-shaped wall layer W1 does not move, the transmittivity while applying a voltage thereto is reduced, i.e., the aperture ratio is reduced. Therefore, the smaller the interval (pitch) of the wall layers of the grid-shaped wall layer W1, the larger the ratio of the grid-shaped wall layer W1 to the display patterns, i. e., the smaller the aperture ratio. In order to suppress the reduction of the aperture ratio, the line-width of the grid-shaped wall layer W1 is as small as possible; however, a minimum value of the line-width of the grid-shaped wall layer W1 is about 10 μm in view of a photolithography process for forming the grid-shaped wall layer W1.

Figure 9:
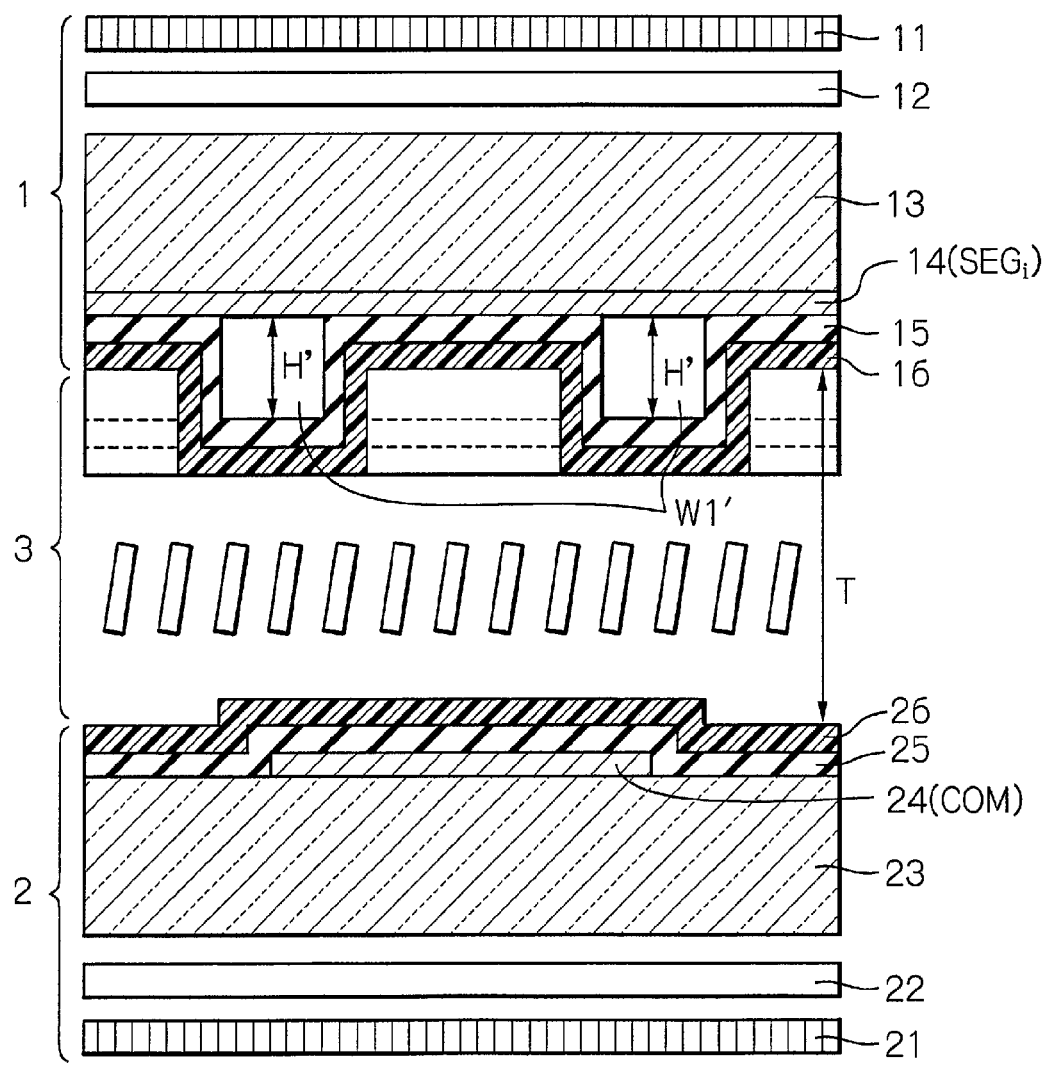
FIGS. 9 and 10 are cross-sectional views illustrating modifications of the character type vertical alignment mode LCD device of FIG. 6.

Instead of the grid-shaped wall layer W1 provided on the side of the common electrode layer 24 as illustrated in FIG. 6, a grid-shaped wall layer W1' can be provided on the side of the segment electrode layer 14 as illustrated in FIG. 9, thus exhibiting the same suppressing effect of the DMA phenomenon.

Figure 10:
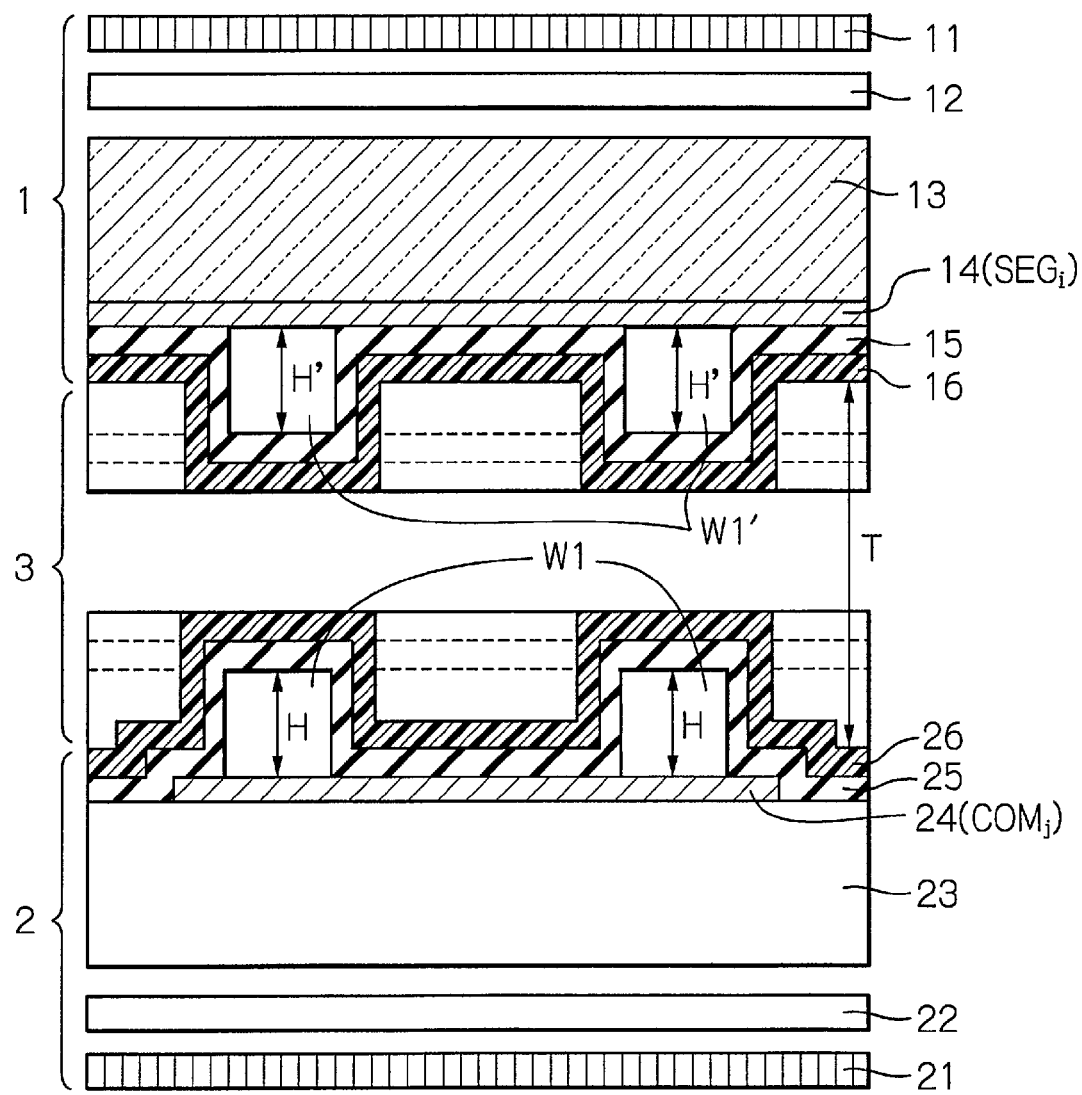

Further, in addition to the grid-shaped wall layer W1 provided on the side of the common electrode layer 24 as illustrated in FIG. 6, a grid-shaped wall layer W1' can be provided on the side of the segment electrode layer 14 as illustrated in FIG. 10, thus exhibiting the same suppressing effect of the DMA phenomenon. In this case, the height H of the grid-shaped wall layer W1 plus the height H' of the grid-shaped wall layer W1' is not smaller than half of the thickness T of the vertical alignment mode liquid crystal layer 3, i.e., $$H+H' \geq T/2.$$

However, if H+H'=T, it is impossible to move liquid crystal between the upper structure 1 and the lower structure 2 during a liquid crystal vacuum injecting process for forming the vertical alignment mode liquid crystal layer 3. Therefore, in view of this, the following should be satisfied:

$$H+H' \leq 0.9T.$$

Note that H+H'=T may be satisfied if a liquid crystal dropping process is used.

In this case, since the grid-shaped wall layers are provided on both sides of the segment electrode layer 14 and the common electrode layer 24 so that the height of each grid-shaped wall layer can be decreased, the portions of the vertical alignment layers 16 and 26 on the sidewalls of the grid-shaped wall layers, which portions are not subject to a rubbing alignment process, can be decreased. As a result, the director of liquid crystal within the dot is less affected by the grid-shaped wall layer.

Also, in the above-described first embodiment, when the grid-shaped wall layers are provided both on the side of the common electrode layer 24 and on the side of the segment electrode layer 14, the grid-shaped wall layer on one side can be transparent and the grid-shaped wall layer on the other side can be opaque (black matrix).

Figure 11:
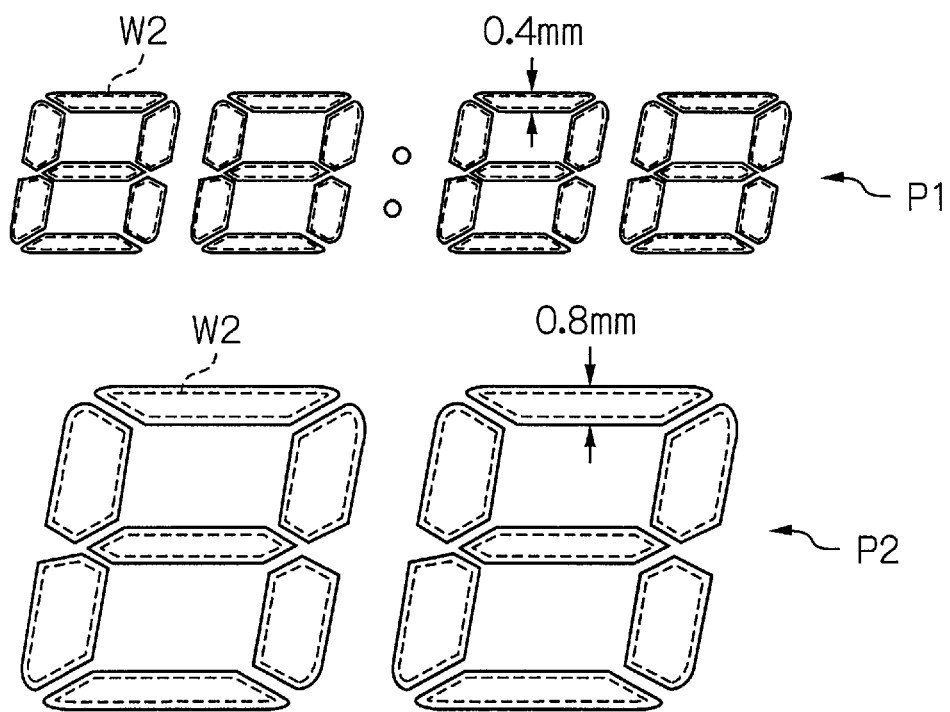
FIG. 11 is a layout diagram illustrating a second embodiment of the character type vertical alignment mode LCD device according to the presently disclosed subject matter.

In FIG. 11, which illustrates a second embodiment of the character type vertical alignment mode LCD device according to the presently disclosed subject matter, wall layers W2 are added to the elements of the prior art character type vertical alignment mode LCD device of FIGS. 1, 2 and 3. Even in FIG. 11, note that the display patterns of FIG. 3 is illustrated, but the segment electrodes SEG1, SEG2, . . . , SEG13 of FIG. 1 and the common electrodes COM1, COM2, . . . , COM6 of FIG. 2 are omitted.

Each of the wall layers W2 has a shape along a periphery of the small-sized display pattern P1 or along a periphery of the large-sized display pattern P2, to thereby suppress the DMA phenomenon caused by an oblique electric field at the small-sized display pattern P1 and the large-sized display pattern P2, and also suppress the propagation of the DMA phenomenon.

Figure 12:
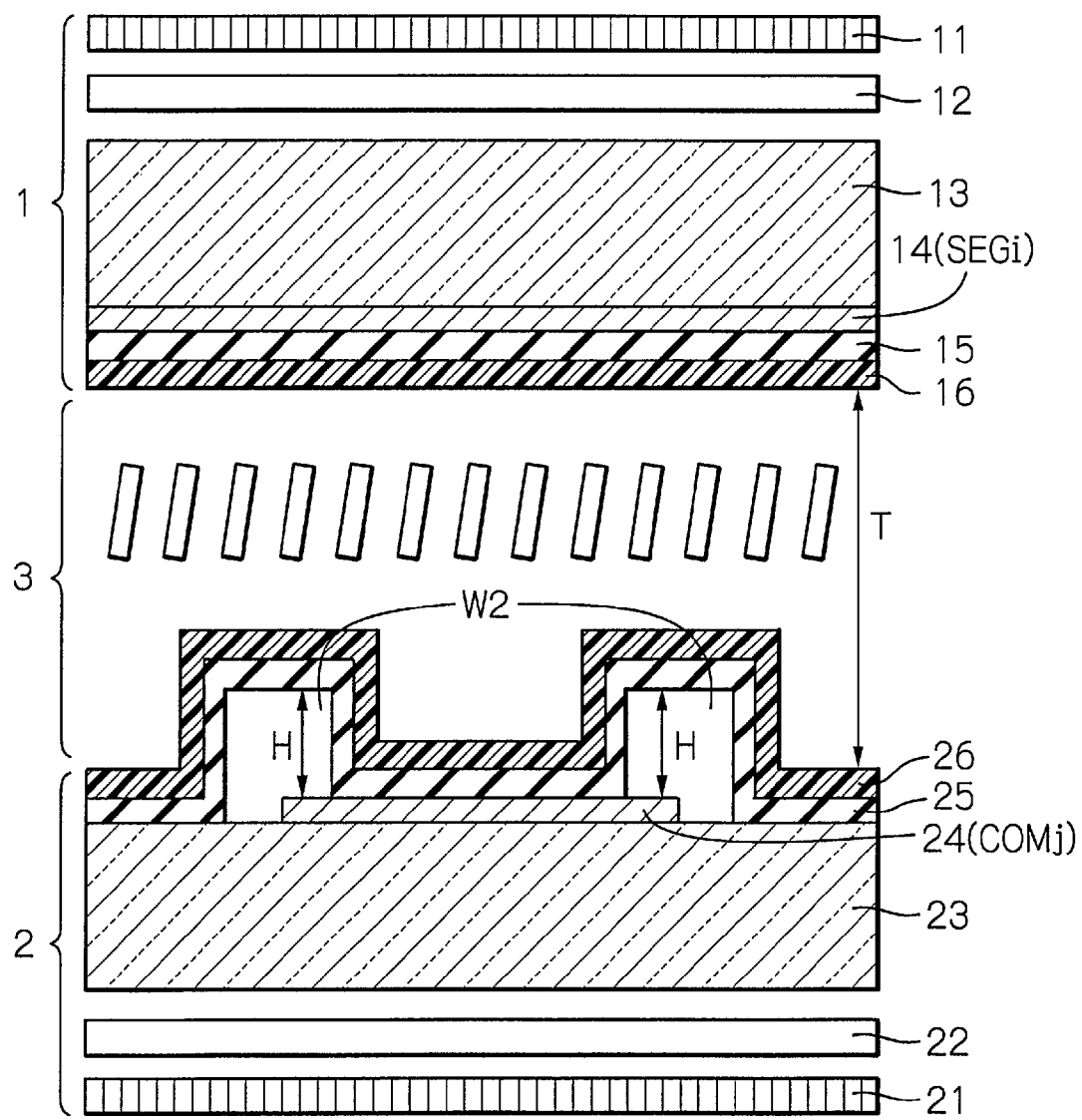
FIG. 12 is a cross-sectional view of the character type vertical alignment mode LCD device of FIG. 11.

Referring to FIG. 12, which is a cross-sectional view of the character type vertical alignment mode LCD device of FIG. 11, the wall layers W2 are about 50 µm wide and are on the transparent common electrode layer 24 and the glass substrate 23. Also, a height H of the wall layers W2 is $$H \geq T/2.$$

Figure 13:
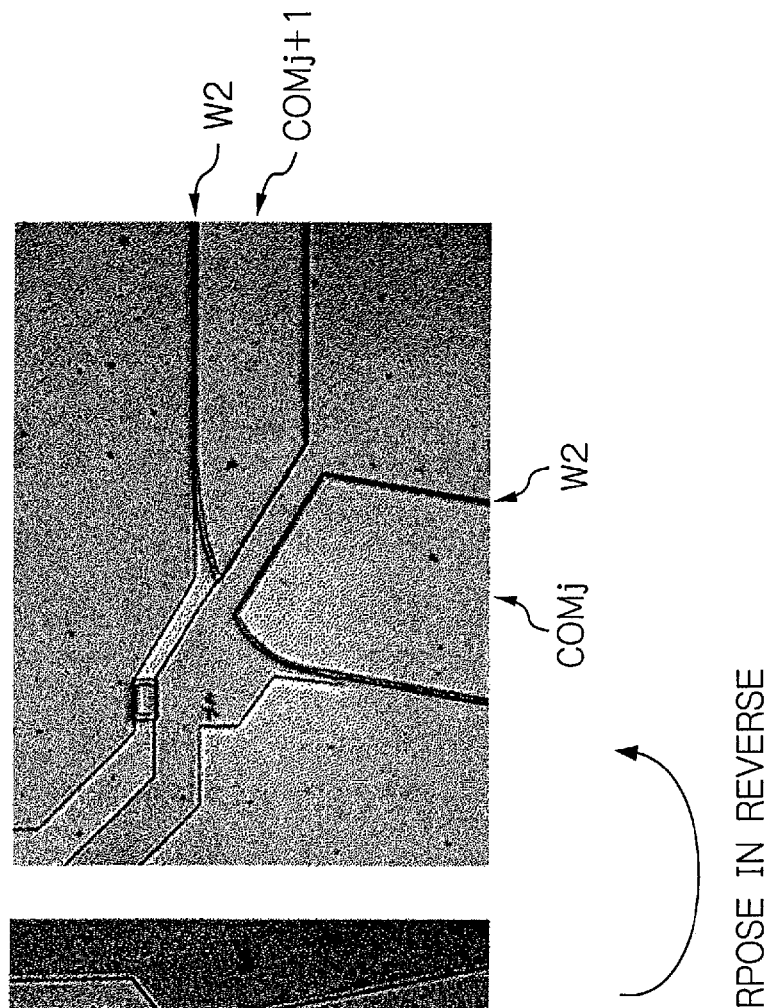
FIG. 13 is a microscopic picture diagram illustrating a first example of the wall layers of FIG. 11.

FIG. 13 is a microscopic picture diagram illustrating a first example of actual wall layers W2 of FIG. 11. In more detail, (A) illustrates segment electrodes SELi and SELi+1 viewed from the bottom of the upper structure 1, and (B) illustrates common electrodes COMj and COMj+1 and the wall layers W2 viewed from the top of the lower structure 2. The segment electrodes SELi and SELi+1 of FIG. 13(A) are superposed in reverse onto the common electrodes COMj and COMj+1 of (B) of FIG. 13(B).

Figure 14:
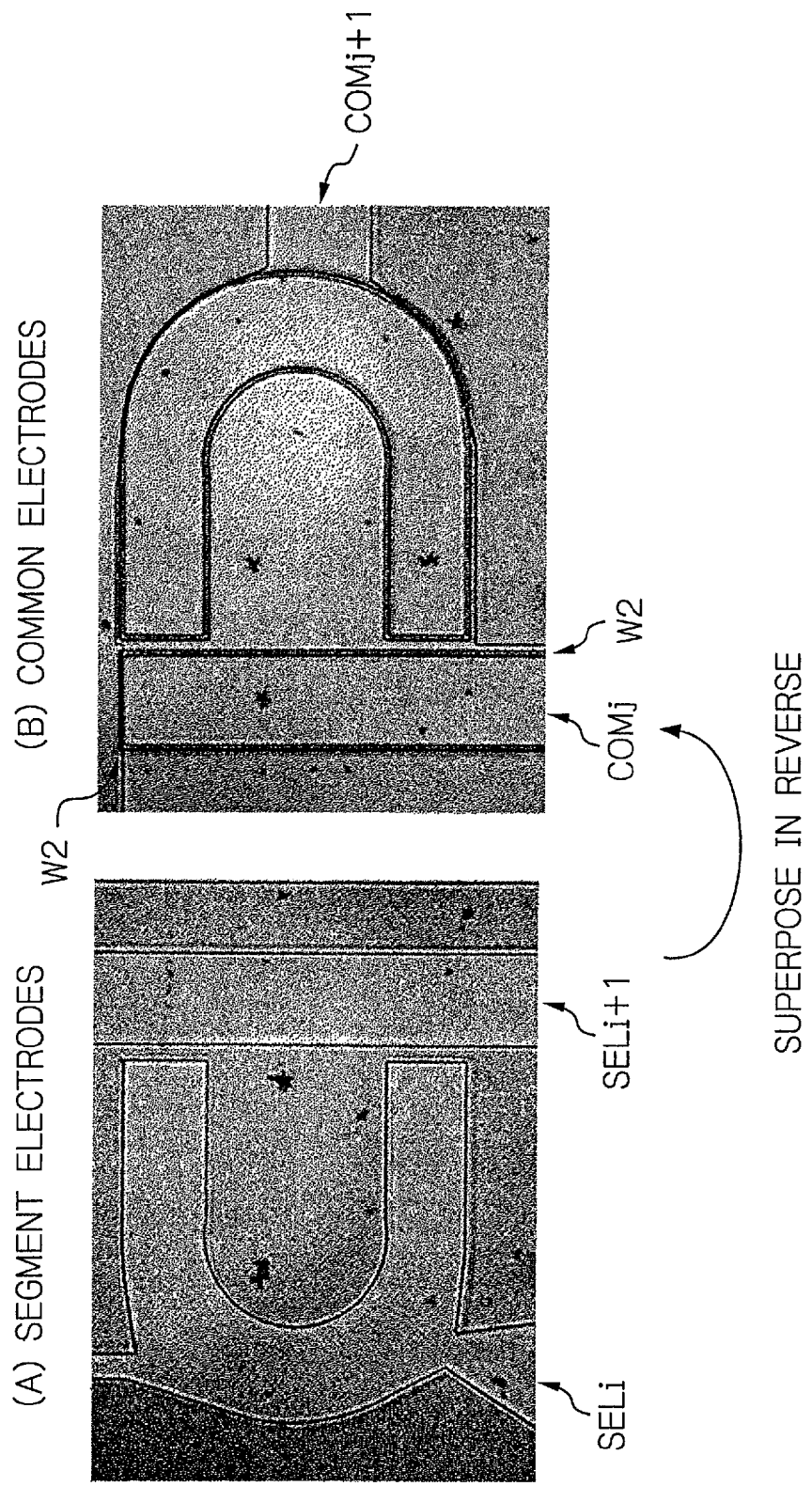
FIG. 14 is a microscopic picture diagram illustrating a second example of the wall layers of FIG. 11.

FIG. 14 is a microscopic picture diagram illustrating a second example of actual wall layers W2 of FIG. 11. In more detail, (A) illustrates segment electrodes SELi and SELi+1 viewed from the bottom of the upper structure 1, and (B) illustrates common electrodes COMj and COMj+1 and the wall layers W2 viewed from the top of the lower structure 2. The segment electrodes SELi and SELi+1 of FIG. 14(A) are superposed in reverse onto the common electrodes COMj and COMj of (B) of FIG. 14(B).

Figure 15:
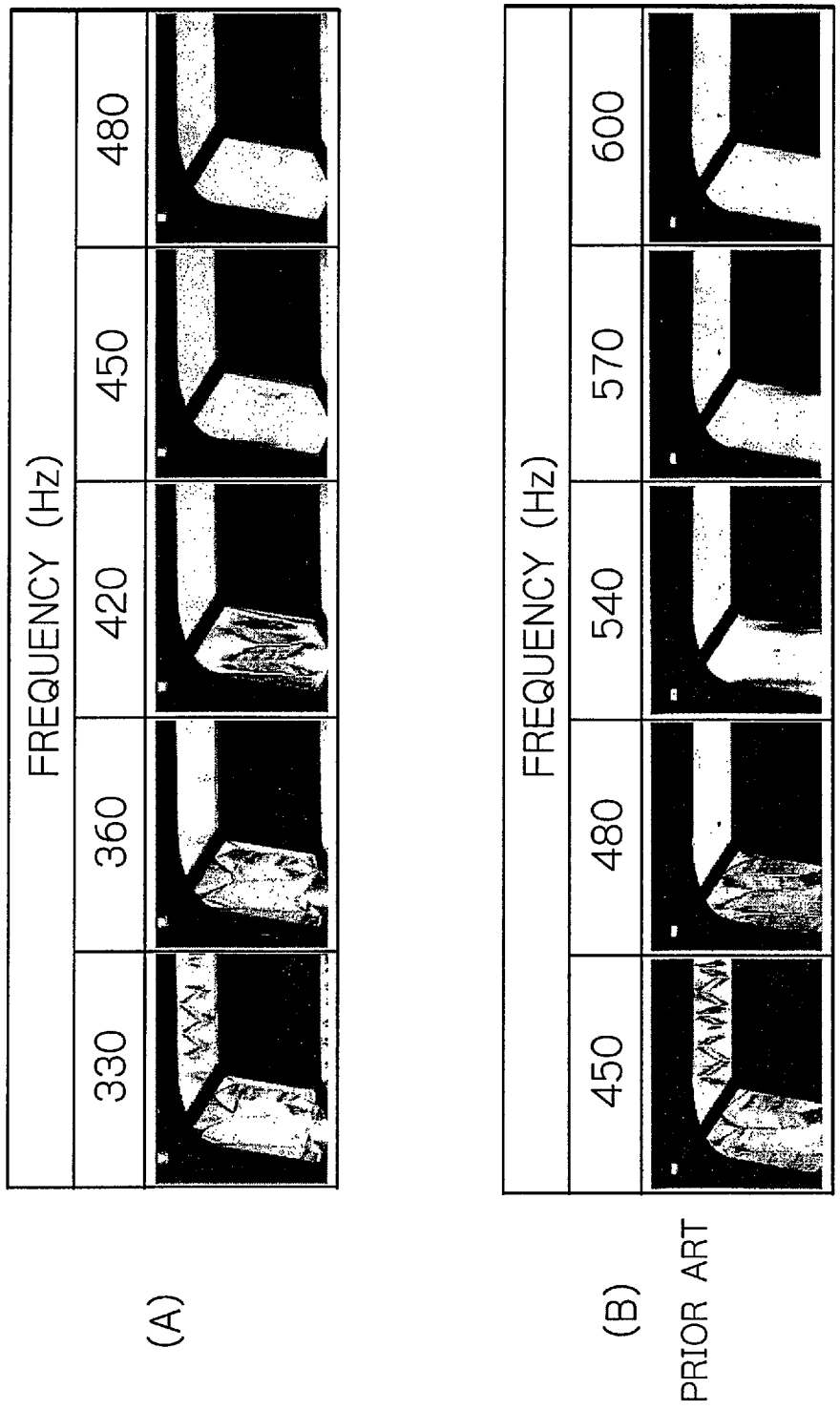

The experimental results of the small-sized display pattern P1 of the character type vertical alignment mode LCD device of FIGS. 11 and 12 driven by using the B-waveform at a 1/64 duty ratio and a bias of 1/9 are illustrated in FIG. 15.

As illustrated in FIG. 15(A), when $\theta_p=89.5°$, black shadow regions caused by the DMA phenomenon were visible around the wall layers W2 at 450 Hz or less, black shadow regions caused by the DMA phenomenon propagated from one wall layer to one entire pattern unit at 420 Hz or less, and black shadow regions caused by the DMA phenomenon propagated from one pattern unit to its adjacent pattern unit at 330 Hz or less. On the other hand, no black shadow regions were visible at 480 Hz or more, to realize an excellent transmission state of white dots.

Also, as illustrated in FIG. 15(B), when the prior art character type vertical alignment mode LCD device with no wall layer driven by the same conditions as in FIG. 15(A), black shadow regions caused by the DMA phenomenon were visible at 570 Hz or less, black shadow regions caused by the DMA phenomenon propagated from one wall layer to one entire pattern unit at 480 Hz or less, and black shadow regions caused by the DMA phenomenon propagated from one pattern unit to its adjacent pattern unit at 450 Hz or less. On the other hand, no black shadow regions were visible at 600 Hz or more, to realize an excellent transmission state of white dots.

Thus, since a frequency for realizing a stable alignment state was lower in FIG. 15(A) than in FIG. 15(B), the DMA phenomenon was also clearly suppressed as compared with the prior art character type vertical alignment mode LCD device with no wall layer. That is, the wall layers W2 have the same shape as the periphery of the display pattern units including edges of the segment elements or the common electrodes, thereby to suppress the effect of oblique electric fields at the edges of the segment electrodes or the common electrodes. As a result, generation of the DMA phenomenon can be suppressed, and propagation of the DMA phenomenon within one display pattern unit or to its adjacent display pattern unit can be suppressed.

Note that, when $\theta_p=89.5°$, if the thickness T of the vertical alignment mode liquid crystal layer 3 was 4 µm and the height H of the wall layers W2 was 2 µm (H=T/2), the DMA phenomenon was suppressed. However, if the thickness T of the vertical alignment mode liquid crystal layer 3 was 4 µm and the height H of the wall layers W2 was 1 µm (H=T/4), the DMA phenomenon was not suppressed.

In more detail, in order to suppress the DMA phenomenon, the following is satisfied:

$$H \geq T/2.$$

For example, when the thickness T of the vertical alignment mode liquid crystal layer 3 was 2 µm and the height H of the wall layers W2 was 0.7 µm (H/T=0.35), black shadow regions caused by the DMA phenomenon were visible even at 390 Hz. Therefore, the DMA phenomenon was not so suppressed as compared with the case where H=T/2.

Also, when the thickness T of the vertical alignment mode liquid crystal layer 3 was 2 µm and the height H of the wall layers W2 was 1.2 µm (H/T=0.60), black shadow regions caused by the DMA phenomenon were visible at 360 Hz, while no black shadow regions were visible at 390 Hz or more. The DMA phenomenon was more suppressed as compared with the case where H=T/2.

Thus, in order to suppress the DMA phenomenon, the following is satisfied:

$$H \geq T/2.$$

Even in this case, if H=T, it is impossible to move liquid crystal between the upper structure 1 and the lower structure 2 during a liquid crystal vacuum injecting process for forming the vertical alignment mode liquid crystal layer 3. Thus, in view of this, the following is satisfied:

$$H \leq 0.9T.$$

However, if a liquid crystal dropping process is used for forming the vertical alignment mode liquid crystal layer 3, where the liquid crystal dropping interval (pitch) is smaller than the interval (pitch) of the wall layers of b the wall layers W2, H=T creates no problem. Of course, in the case of such a liquid crystal dropping process where the liquid crystal dropping interval (pitch) is not smaller than the interval (pitch) of the wall layers of the wall layers W2, the above-mentioned condition, i. e., H≤0.9T should be satisfied in the same way as in a liquid crystal vacuum injecting process.

The experimental results of the character type vertical alignment mode LCD device of FIGS. 11 and 12 driven by using the B-waveform at a 1/64 duty ratio and a bias of 1/9 are also illustrated in FIG. 16.

As illustrated in FIG. 16(A), which illustrates the small-sized display pattern P1 whose line-width is about 0.4 mm, no black shadow regions were visible at 360 Hz or more, to realize an excellent transmission state of white dots.

On the other hand, as illustrated in FIG. 16(B), which illustrates the large-sized pattern P2 whose line-width was about 0.8 mm, no black shadow regions were visible at 450 Hz or more, to realize an excellent transmission state of white dots.

Thus, the spacing between the wall layers W2 should be 400 μm or less.

Figure 17:
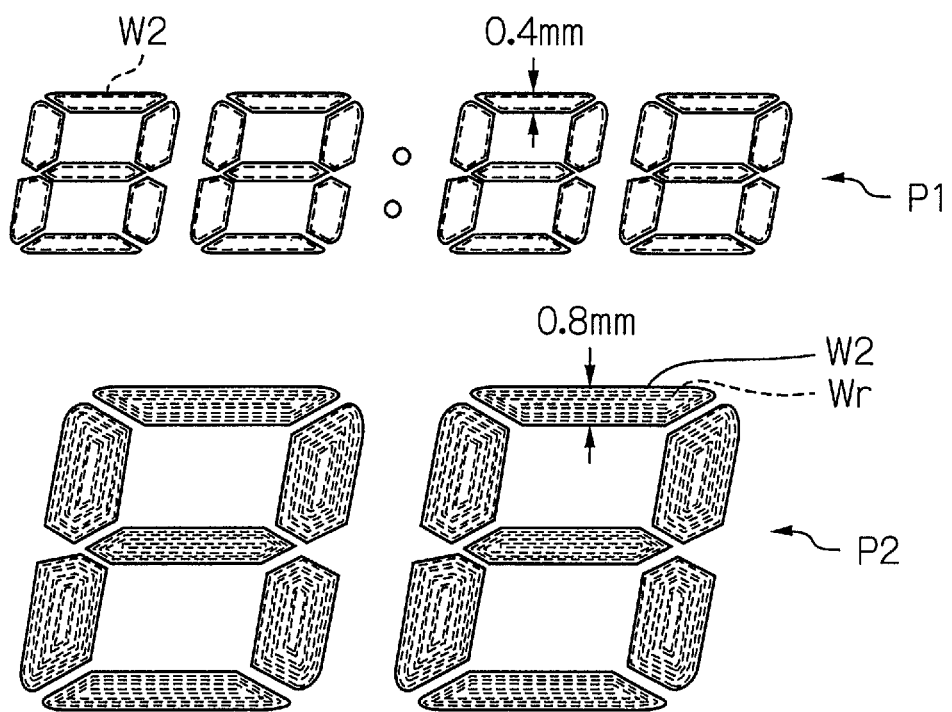
FIG. 17 is a layout diagram illustrating a modification of the character type vertical alignment mode LCD device of FIG. 11.

In FIG. 17, which illustrates a modification of the character type vertical alignment mode LCD device of FIG. 11, additional wall layers Wr having reduced shapes of the wall layers W2 are added to the large-sized pattern P2. As a result, even in the large-sized pattern P2, the spacing between the wall layers W2 and the additional wall layers Wr is 400 μm or less. Therefore, the visibility while applying a voltage is the same in the large-sized pattern P2 as in the small-sized pattern P1.

Figure 18:
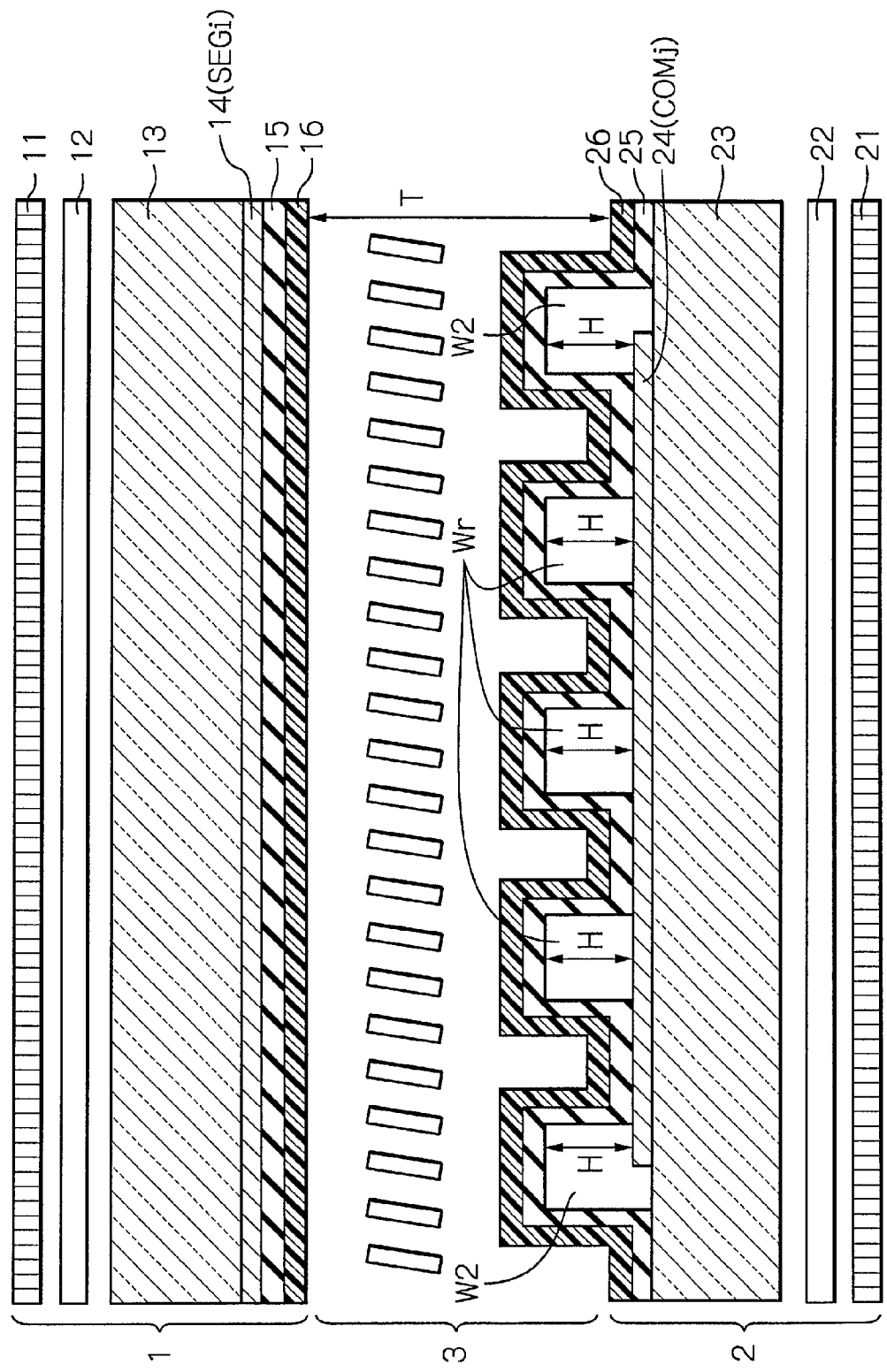
FIG. 18 is a cross-sectional view of the character type vertical alignment mode LCD device of FIG. 17.

The cross-sectional view of the large-sized pattern P2 of the character type vertical alignment mode LCD device of FIG. 17 is illustrated in FIG. 18.

On the other hand, since liquid crystal at the grid-shaped wall layers W2 and Wr does not move, the transmittivity while applying a voltage thereto is reduced, i.e., the aperture ratio is reduced. Therefore, the smaller the spacing between the wall layers W2 and Wr, the larger the ratio of the wall layers W2 and Wr to the display patterns, i. e., the smaller the aperture ratio. In order to suppress the reduction of the aperture ratio, the line-width of the wall layers W2 and Wr is as small as possible; however, a minimum value of the line-width of the wall layers W2 and Wr is about 10 μm in view of a photolithography process for forming the wall layers W2 and Wr.

Figure 19:
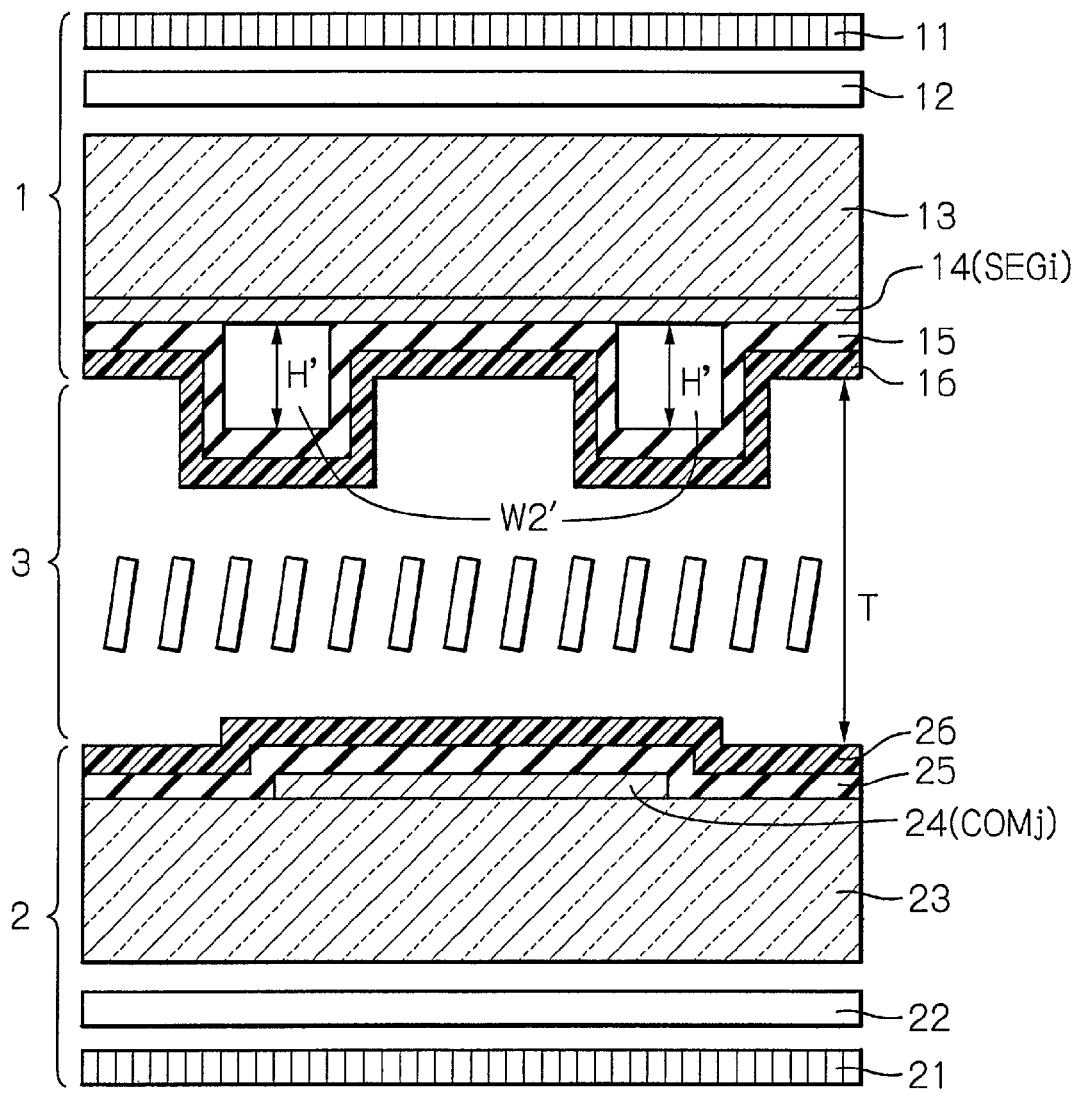
FIGS. 19 and 20 are cross-sectional views illustrating modifications of the character type vertical alignment mode LCD device of FIG. 12.
Figure 20:
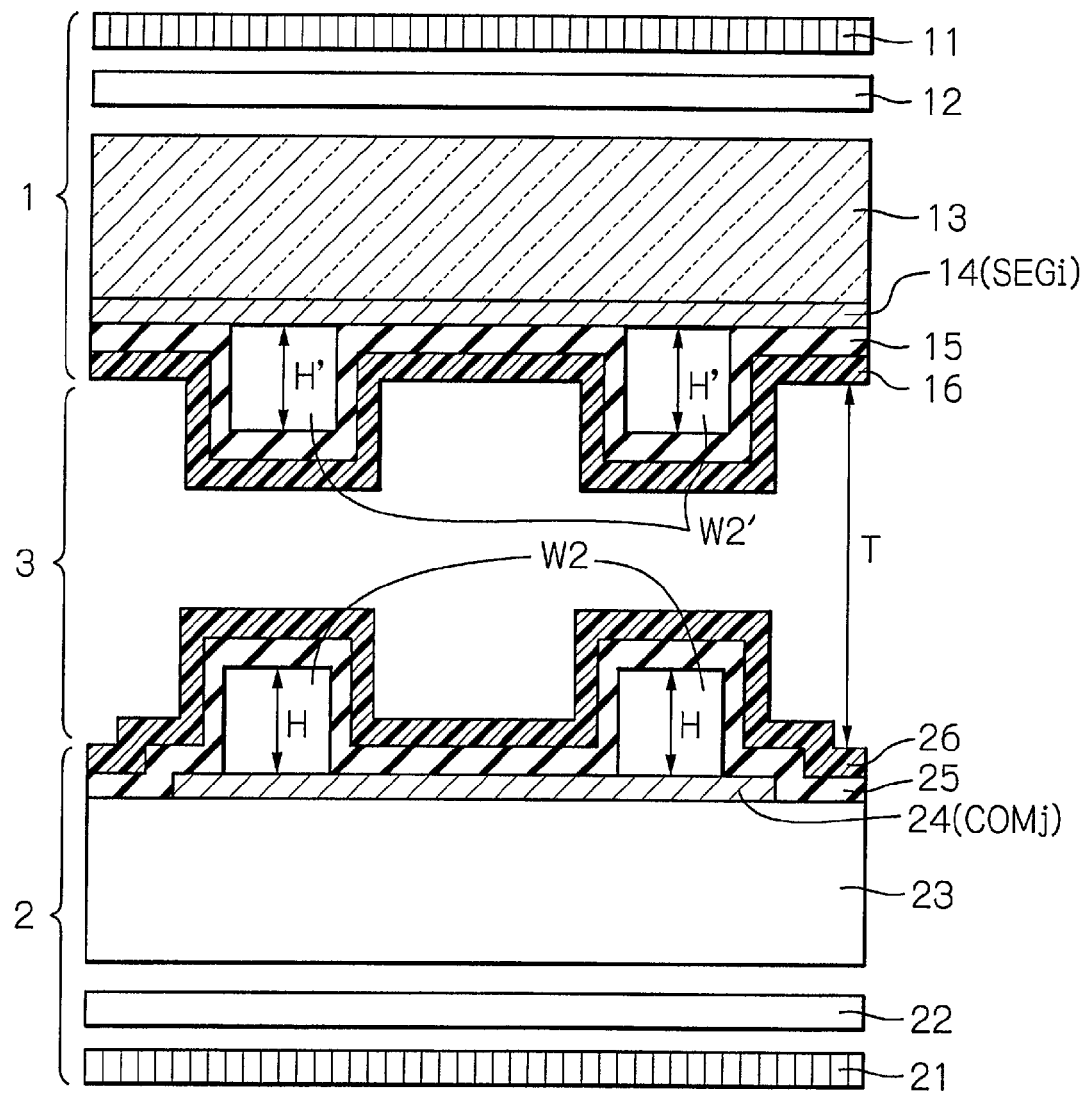

Instead of the wall layers W2 provided on the side of the common electrode layer 24 as illustrated in FIG. 12 or 18, wall layers W2' can be provided on the side of the segment electrode layer 14 as illustrated in FIG. 19, thus exhibiting the same suppressing effect of the DMA phenomenon.

Further, in addition to the wall layers W2 provided on the side of the common electrode layer 24 as illustrated in FIG. 12, wall layers W2' can be provided on the side of the segment electrode layer 14 as illustrated in FIG. 19, thus exhibiting the same suppressing effect of the DMA phenomenon. In this case, the height H of the wall layers W2 plus the height H' of the wall layers W2' is not smaller than half of the thickness T of the vertical alignment mode liquid crystal layer 3, i.e., $$H+H' \geq T/2.$$

However, if H+H'=T, it is impossible to move liquid crystal between the upper structure 1 and the lower structure 2 during a liquid crystal vacuum injecting process for forming the vertical alignment mode liquid crystal layer 3. Therefore, in view of this, the following should be satisfied:

$$H+H' \leq 0.9T.$$

Note that H+H'=T may be satisfied if a liquid crystal dropping process is used.

Even in this case, since the wall layers are provided on both sides of the segment electrode layer 14 and the common electrode layer 24 so that the height of each of the wall layers can be decreased, the portions of the vertical alignment layers 16 and 26 on the sidewalls of the wall layers, which portions are not subject to a rubbing alignment process, can be decreased. As a result, the director of liquid crystal within the dot is less affected by the wall layers.

Also, in the above-described second embodiment, when the wall layers are provided both on the side of the common electrode layer 24 and on the side of the segment electrode layer 14, the wall layers on one side can be transparent and the wall layers on the other side can be opaque (black matrix).

The presently disclosed subject matter can be applied to both a transmission-type LCD and a reflection-type LCD. In the case of the reflection-type LCD, a reflective layer can be provided on an outer side of one of the polarizers, and light can enter and exit at the other polarizer.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

What is claimed is:

1. A character type vertical alignment mode liquid crystal display device comprising:
   first and second substrates opposing each other;
   a first electrode layer including a plurality of first electrodes provided at an inner side of said first substrate;
   a second electrode layer including a plurality of second electrodes provided at an inner side of said second substrate;
   first and second vertical alignment layers provided between said first and second substrates to cover said first and second electrode layers, respectively, said first and second vertical alignment layers being subject to an alignment process from at least one side of said first and second vertical alignment layers;
   a mono-domain type vertical alignment mode liquid crystal layer provided between said first and second substrates, one of said first and second alignment layers giving a pretilt angle in liquid crystal modules in said mono-domain type vertical alignment mode liquid crystal layer; and
   a wall structure provided between said first and second substrates;
   wherein said wall structure comprises wall layers each with a shape along a periphery of one of display patterns formed by superposing said segment electrodes onto said common electrodes; and
   wherein a height of said wall structure is not smaller than half of a height of said mono-domain type vertical alignment mode liquid crystal layer.

2. The character type vertical alignment mode liquid crystal display device according to claim 1, wherein said wall structure further comprises additional wall layers having reduced shapes of said wall layers.

3. The character type vertical alignment mode liquid crystal display device according to claim 2, wherein a spacing between said wall layers and said additional wall layers is 400 μm or less.

4. The character type vertical alignment mode liquid crystal display device according to claim 1, wherein said wall structure is provided on a side of one of said first and second substrates.

5. The character type vertical alignment mode liquid crystal display device according to claim 1, wherein said wall structure is provided on sides of both of said first and second substrates.

6. The character type vertical alignment mode liquid crystal display device according to claim 5, wherein a total height of said wall structure on the sides of both of said first and second substrates is not smaller than half of a height of said mono-domain type vertical alignment mode liquid crystal layer.

7. The character type vertical alignment mode liquid crystal display device according to claim 1, wherein said first electrodes comprise segment electrodes, and said second electrodes comprise common electrodes.

8. The character type vertical alignment mode liquid crystal display device according to claim 1, wherein said first electrodes comprise common electrodes, and said second electrodes comprise segment electrodes.

9. The character type vertical alignment mode liquid crystal display device according to claim 1, wherein said wall structure comprises ultraviolet ray hardening resin.

* * * * *